(12) United States Patent
Desanti et al.

(10) Patent No.: US 12,105,989 B2
(45) Date of Patent: Oct. 1, 2024

(54) STORAGE SUBSYSTEM-DRIVEN ZONING PROTOCOL EMBODIMENTS IN A NONVOLATILE MEMORY EXPRESS ENVIRONMENT

(71) Applicant: DELL PRODUCTS L.P., Round Rock, TX (US)

(72) Inventors: Claudio Desanti, Santa Cruz, CA (US); David Black, Acton, MA (US)

(73) Assignee: DELL PRODUCT L.P., Round Rock, TX (US)

( * ) Notice: Subject to any disclaimer, the term of this patent is extended or adjusted under 35 U.S.C. 154(b) by 0 days.

(21) Appl. No.: 17/699,005

(22) Filed: Mar. 18, 2022

(65) Prior Publication Data

US 2023/0297280 A1   Sep. 21, 2023

(51) Int. Cl.
    *G06F 3/06*           (2006.01)
(52) U.S. Cl.
    CPC .......... *G06F 3/0659* (2013.01); *G06F 3/0604* (2013.01); *G06F 3/0635* (2013.01); *G06F 3/067* (2013.01)
(58) Field of Classification Search
    CPC .... G06F 3/0659; G06F 3/0604; G06F 3/0635; G06F 3/067
    See application file for complete search history.

(56) References Cited

U.S. PATENT DOCUMENTS

| | | |
|---|---|---|
| 7,185,334 B2 | 2/2007 | Bourke-Dunphy |
| 8,375,014 B1 | 2/2013 | Brocato |
| 9,516,108 B1 | 12/2016 | Sullivan |
| 10,225,138 B2 | 3/2019 | Wu |
| 10,372,926 B1 | 8/2019 | Leshinsky |
| 10,771,340 B2 | 9/2020 | Ballapuram |
| 10,877,669 B1 | 12/2020 | Sivasubramanian |
| 11,323,355 B1 | 5/2022 | Gupta |
| 11,442,652 B1 | 9/2022 | Dailey |
| 11,451,470 B2 | 9/2022 | Power |
| 11,489,723 B2 | 11/2022 | Smith |
| 11,520,518 B2 | 12/2022 | Desanti |

(Continued)

OTHER PUBLICATIONS

"NVMe-oF™: Discovery Automation for NVMe® IP-based SANs," SNIA NSF Networking Storage, Nov. 2021. (49pgs).

(Continued)

*Primary Examiner* — Michelle T Bechtold
(74) *Attorney, Agent, or Firm* — NORTH WEBER & BAUGH LLP

(57) ABSTRACT

Embodiments presented herein solve issues related to non-volatile memory express (NVMe®) protocol differences from other protocols, such as Fibre Channel Common Transport, which is the protocol used for Zoning management in Fibre Channel. Fibre Channel Common Transport supports bidirectional transfers of data. However, NVMe® commands support transfer of data either with the command (e.g., host-to-controller data transfer (e.g., a "write" operation)) or with the response (e.g., controller-to-host data transfer (e.g., a "read" operation)), but not both creates a problem related to zoning in NVMe® networks. Furthermore, data size limits for submission queue entries and completion queue entries for NVMe® commands add other obstacles. Embodiments herein address these limitations.

20 Claims, 26 Drawing Sheets

(56) References Cited

U.S. PATENT DOCUMENTS

| | | |
|---|---|---|
| 11,543,966 B1 | 1/2023 | Varghese |
| 11,550,734 B1 | 1/2023 | Matosevich |
| 11,579,808 B2 | 2/2023 | Satapathy |
| 11,614,970 B2 | 3/2023 | Huang |
| 11,625,273 B1 | 4/2023 | Elhemali |
| 11,675,499 B2 | 6/2023 | Dhatchinamoorthy |
| 11,805,171 B2 | 10/2023 | Smith |
| 11,818,031 B2 | 11/2023 | Smith |
| 11,822,545 B2 | 11/2023 | Cappiello |
| 11,907,530 B2 | 2/2024 | Desanti |
| 2002/0016921 A1 | 2/2002 | Olsen |
| 2012/0254554 A1 | 10/2012 | Nakajima |
| 2013/0297835 A1 | 11/2013 | Cho |
| 2015/0038076 A1 | 2/2015 | Naruse |
| 2016/0241659 A1* | 8/2016 | Wessendorf .......... H04L 67/303 |
| 2017/0048322 A1* | 2/2017 | Desanti ................ H04L 49/00 |
| 2018/0074717 A1 | 3/2018 | Olarig |
| 2018/0074984 A1 | 3/2018 | Olarig |
| 2018/0270119 A1 | 9/2018 | Ballapuram |
| 2019/0020603 A1 | 1/2019 | Subramani |
| 2019/0042144 A1 | 2/2019 | Peterson |
| 2019/0047841 A1 | 2/2019 | Chang |
| 2019/0332766 A1 | 10/2019 | Guri |
| 2019/0334949 A1 | 10/2019 | Guri |
| 2020/0136996 A1 | 4/2020 | Li |
| 2020/0409893 A1 | 12/2020 | Puttagunta |
| 2021/0037105 A1 | 2/2021 | Smith-Denny |
| 2021/0286540 A1 | 8/2021 | Tylik |
| 2021/0286741 A1 | 9/2021 | Smith |
| 2021/0286745 A1 | 9/2021 | Smith |
| 2021/0288878 A1 | 9/2021 | Smith |
| 2021/0289027 A1 | 9/2021 | Smith |
| 2021/0289029 A1 | 9/2021 | Smith |
| 2021/0311899 A1 | 10/2021 | Smith |
| 2021/0397351 A1 | 12/2021 | Dhatchinamoorthy |
| 2022/0014592 A1* | 1/2022 | Kachare ................. H04L 67/12 |
| 2022/0030062 A1 | 1/2022 | Jennings |
| 2022/0066799 A1 | 3/2022 | Pinto |
| 2022/0237274 A1 | 7/2022 | Paul |
| 2022/0286377 A1 | 9/2022 | Smith |
| 2022/0286508 A1 | 9/2022 | Smith |
| 2023/0035799 A1 | 2/2023 | Desanti |
| 2023/0305700 A1 | 9/2023 | Desanti |
| 2023/0325200 A1 | 10/2023 | Desanti |
| 2024/0020055 A1 | 1/2024 | Desanti |
| 2024/0020056 A1 | 1/2024 | Desanti |
| 2024/0020057 A1 | 1/2024 | Paulchamy |

OTHER PUBLICATIONS

Office Action, in the related matter, U.S. Appl. No. 17/863,300. (18pgs).

Respone filed Feb. 9, 2024, in the related matter, U.S. Appl. No. 17/863,300. (16pgs).

Office Action received Mar. 6, 2024, in the related matter, U.S. Appl. No. 17/863,300. (23pgs).

Office Action received Mar. 14, 2024, in the related matter, U.S. Appl. No. 17/863,263. (25pgs).

Claudio DeSanti, "Subsystem Driven Zoning with Pull Registration Model," nvm Express, Feb. 1, 2022. (8pgs).

Office Action received Jan. 24, 2024, in the related matter, U.S. Appl. No. 17/863,277. (15pgs).

Response filed Jun. 6, 2024, in the related matter, U.S. Appl. No. 17/863,300. (14pgs).

Response filed Jun. 7, 2024, in the related matter, U.S. Appl. No. 17/863,263. (16pgs).

Notice of Allowance & Fee(s) Due received Jun. 25, 2024, in the related matter, U.S. Appl. No. 17/863,277. (5 pgs).

Final Office Action recieved Jul. 3, 2024, in the related matter, U.S. Appl. No. 17/863,300. (19pgs).

* cited by examiner

200
GAPZ Request ⌒ 202
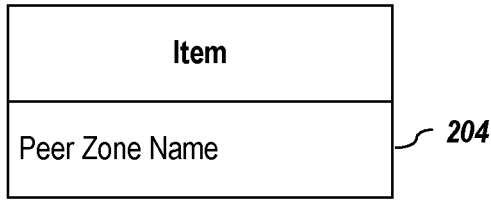
GAPZ Response ⌒ 210
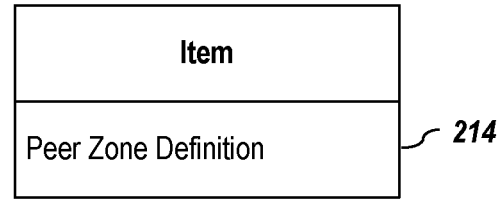
220
AAPZ Request ⌒ 222
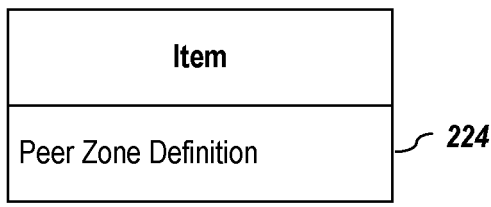
AAPZ Response ⌒ 230
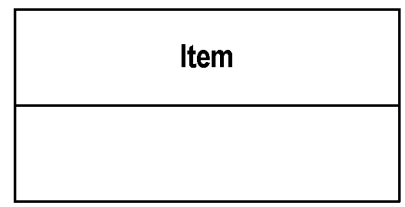
240
RAPZ Request ⌒ 242
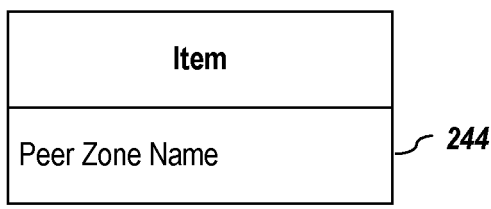
RAPZ Response ⌒ 250
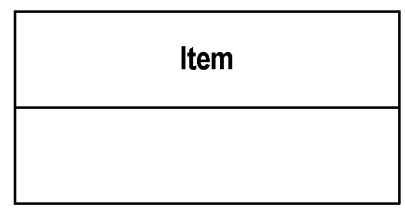
*Prior Art*
FIG. 2

| | ZoneGroup {Florence, NQN(CDC)} | ZoneGroup {Pisa, NQN(Storage3)} | | ZoneGroup {Siena, NQN(CDC)} | |
|---|---|---|---|---|---|
| Zone Name | αβ | γδε | | φ | λ |
| Zone Members | {Host A, host} | {Host B, host} | | {Host E, host} | {Host A, host} |
| | {Storage 1, subsystem} | {Host C, host} | | {Storage 4, subsystem} | {Storage 4, subsystem} |
| | {Storage 2, subsystem} | {Host D, host} | | {Storage 5, subsystem} | |
| | | {Storage 3, subsystem} | | | |

400

405 — ZoneGroup {Florence, NQN(CDC)}
410 — ZoneGroup {Pisa, NQN(Storage3)}
415 — ZoneGroup {Siena, NQN(CDC)}

GAZ Request ⤺ 602

| Item |
|---|
| ZoneGroup Identifier |

⤺ 604

GAZ Response ⤺ 610

| Item |
|---|
| ZoneGroup Definition |

⤺ 614

620

AAZ Request ⤺ 622

| Item |
|---|
| ZoneGroup Definition |

⤺ 624

AAZ Response ⤺ 630

| Item |
|---|
|  |

640

RAZ Request ⤺ 642

| Item |
|---|
| ZoneGroup Name |

⤺ 644

RAZ Response ⤺ 650

| Item |
|---|
|  |

For each zone group from a set of one or more zone groups, maintain a datastore that correlates a token to a zone group identifier for the zone group ⟿ 1205

↓

Responsive to receiving a zoning lookup command comprising submission queue entry and data transfer, in which the data transfer includes a zone group identifier for a zone group and verify if the identified zone group is locked and:
(1) if the zone group is locked, return an error status; and
(2) if the zone group is not locked: (a) use the zone group identifier to obtain a token corresponding to the zone group, identifier for the zone group; and (b) return the token for the zone group ⟿ 1210

↓

Responsive the zoning lookup command not being a remove zone group operation, receive a subsequent command that comprises a submission queue entry that includes the token to identify the zone group ⟿ 1215

FIG. 12

STORAGE SUBSYSTEM-DRIVEN ZONING PROTOCOL EMBODIMENTS IN A NONVOLATILE MEMORY EXPRESS ENVIRONMENT

BACKGROUND

A. Technical Field

The present disclosure relates generally to information handling system. More particularly, the present disclosure relates to zoning in a Storage Area Network (SAN).

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Changes in SAN-related technologies have included the development of NVMe®, which represents a set of specifications related to storage access that allows host systems to communicate with non-volatile memory storage, such as flash and solid-state drives across a number of transports (e.g., PCI Express, RDMA (Remote Direct Memory Access), Fibre Channel (FC), and TCP (Transport Control Protocol)). However, NVMe® implementations have limitations that make it difficult to configure or operate a SAN environment, particularly relative to more mature protocols. Consider the concept of zoning in a Fibre Channel SAN.

Fibre Channel (FC) SAN zoning allows a SAN administrator to control communication between host and storage interfaces by grouping them to a zone. Zones may be created for a number of reasons, including to increase network security, and to prevent data loss or data corruption, by controlling access between devices or user groups. Once in a zone, the interfaces, now referred to as zone members, will be able to communicate with one another when the zone has been added to the active zone set of their fabric.

In Fibre Channel, zoning is managed through the Fabric Zone Server (FZS), either directly or through Peer Zoning, as shown in FIG. 1. FIG. 1 depicts typical zoning management in a Fibre Channel environment. Peer Zoning, which is recorded in Fabric Zone Server 110, may be via a management interface 105, or may be done via a storage subsystem (e.g., Storage 3 115).

Specifically, Peer Zoning allows a storage device (e.g., Storage 3 115) to leverage its administratively configured SCSI (Small Computer System Interface) LUN (Logical Unit Number) masking information to generate Zoning constraints. Peer Zoning may be managed through three operations:
(1) Get Active Peer Zone (GAPZ), to read a Peer Zone from the active zone set;
(2) Add/Replace Active Peer Zone (AAPZ), to write a Peer Zone in the active zone set; and
(3) Remove Active Peer Zone (RAPZ), to delete a Peer Zone in the active zone set.

The information carried in the payloads associated with these operations is shown in FIG. 2. The Get Active Peer Zone (GAPZ) operation 200 comprises a GAPZ Request 202, in which a Peer Zone name 204 is submitted to the Fabric Zone Server, which returns in a GAPZ Response 210, a corresponding Peer Zone definition 214 from the active zone set. The Add/Replace Active Peer Zone (AAPZ) operation 220 comprises an AAPZ Request 222, in which the Peer Zone definition 224 is provided to the Fabric Zone Server for adding or replacing, and the Fabric Zone Server returns a confirmation that the operation has been performed (i.e., confirmation of the addition or replacement of the Peer Zone in the active zone set) by sending an AAPZ Response 230. Finally, the Remove Active Peer Zone (RAPZ) operation 240 comprises a RAPZ Request 242 that includes a Peer Zone name 244 that is to be deleted from the active zone set, and the Fabric Zone Server returns a confirmation (i.e., confirmation of the deletion of the Peer Zone from the active zone set) by sending a RAPZ Response 250.

While Peer Zoning in FC SANs is relatively straightforward, analogous processes do not exist in NVMe® SANs that are based on IP (Internet Protocol) networking. Accordingly, it is highly desirable to find new ways to support analogous zoning operations in NVMe® SANs that are based on IP networking.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 2 depicts Peer Zoning payloads for Fibre Channel operations.

FIG. 4 contains zoning configuration defined in Table 1, according to embodiments of the present disclosure.

FIG. 6 depicts subsystem-driven zoning operations payloads, according to embodiments of the present disclosure.

FIG. 12 depicts a method for performing an operation, according to embodiments of the present disclosure.

DETAILED DESCRIPTION OF EMBODIMENTS

Figure 1:
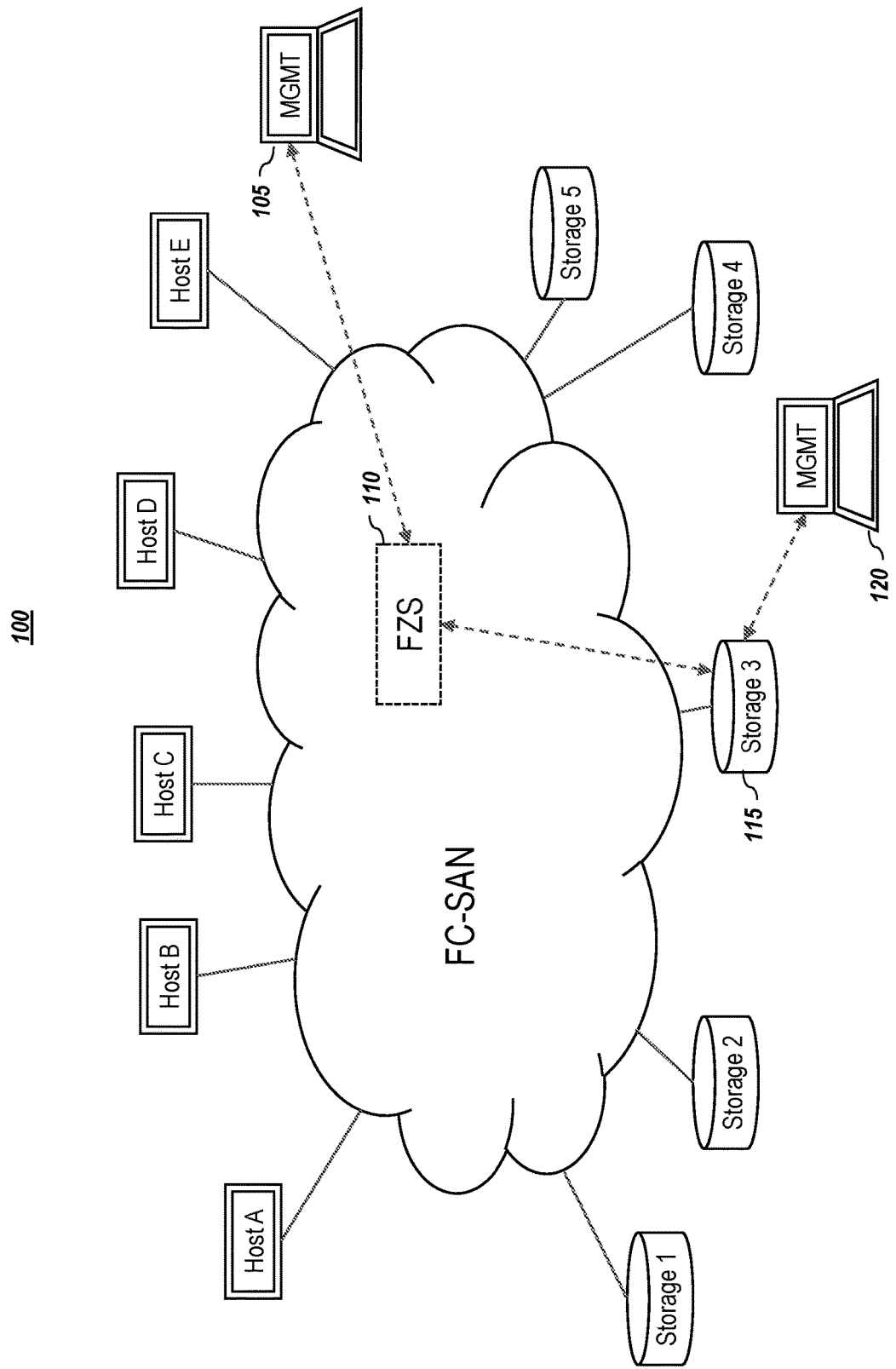
FIG. 1 ("FIG. 1") depicts typical zoning management in a Fibre Channel environment.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, datastore, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of subsystem-driven zoning, aspects of the present disclosure are not so limited. Accordingly, the aspects of the present disclosure may be applied or adapted for use in other contexts.

A. General Introduction

As noted above, zoning operations exist in Fibre Channel, but limitations in NVMe® over IP environments do not support analogous functionality. In NVMe-oF™, zoning configurations (i.e., zone groups) are maintained by a centralized (i.e., network-based) discovery controller (CDC), which may also be referred to as a discovery controller, a central discovery controller, or a root discovery controller.

In one or more embodiments, a zone group is a unit of activation (i.e., a set of access control rules enforceable by the CDC). An example zone group dataset or data structure, according to embodiments of the present disclosure, may comprise a zone group name, a zone group originator, a number presenting the number of zones in the zone group, and a list of zone names or definitions are members of the zone group. In one or more embodiments, a Zone Group Originator is an identifier (e.g., an NVMe® Qualified Name (NQN)) of the entity that created or configured the zone group. For example, in one or more embodiments, the NQN may be the CDC's NQN, if the zone group was created/configured directly via the CDC; or, the NQN may be the NQN of an NVM subsystem, if the zone group was created via an NVM subsystem. It shall be noted that identifying the originator allows the system to determine which entity or entities are allowed to manage or alter an existing zone group.

In one or more embodiments, a zone group may be uniquely identified by a pair, e.g., {ZoneGroup Name, ZoneGroup Originator}, and a zone identifier may be defined by the tuple {{ZoneGroup Name, ZoneGroup Originator}, Zone Name}. It should be noted that previous approaches used global naming, which could create conflicts if two zones had the same name. Thus, such a system only works well if there is a single administrator who is carefully tracking each zone name to ensure that each one is unique. However, there typically is not a single administrator, particularly for large systems, which creates an environment in which zone naming conflicts could easily occur. Unlike the global naming used by previous approaches, each zone in embodiments herein is uniquely identified by the tuple so there will not be a conflict between different zones with the same zone name belonging to different zone groups. For example, if an NVM subsystem configured a zone, Zone Alpha, in a Zone Group 1 and the CDC configures a zone, Zone Alpha, is Zone Group 2, there will not be a conflict between these two zone names because the two zone identifiers are the tuple (e.g., {ZG1, ZGO-NVM_Sub1, Alpha} vs. {ZG2, ZGO-CDC, Alpha}).

Figure 3:
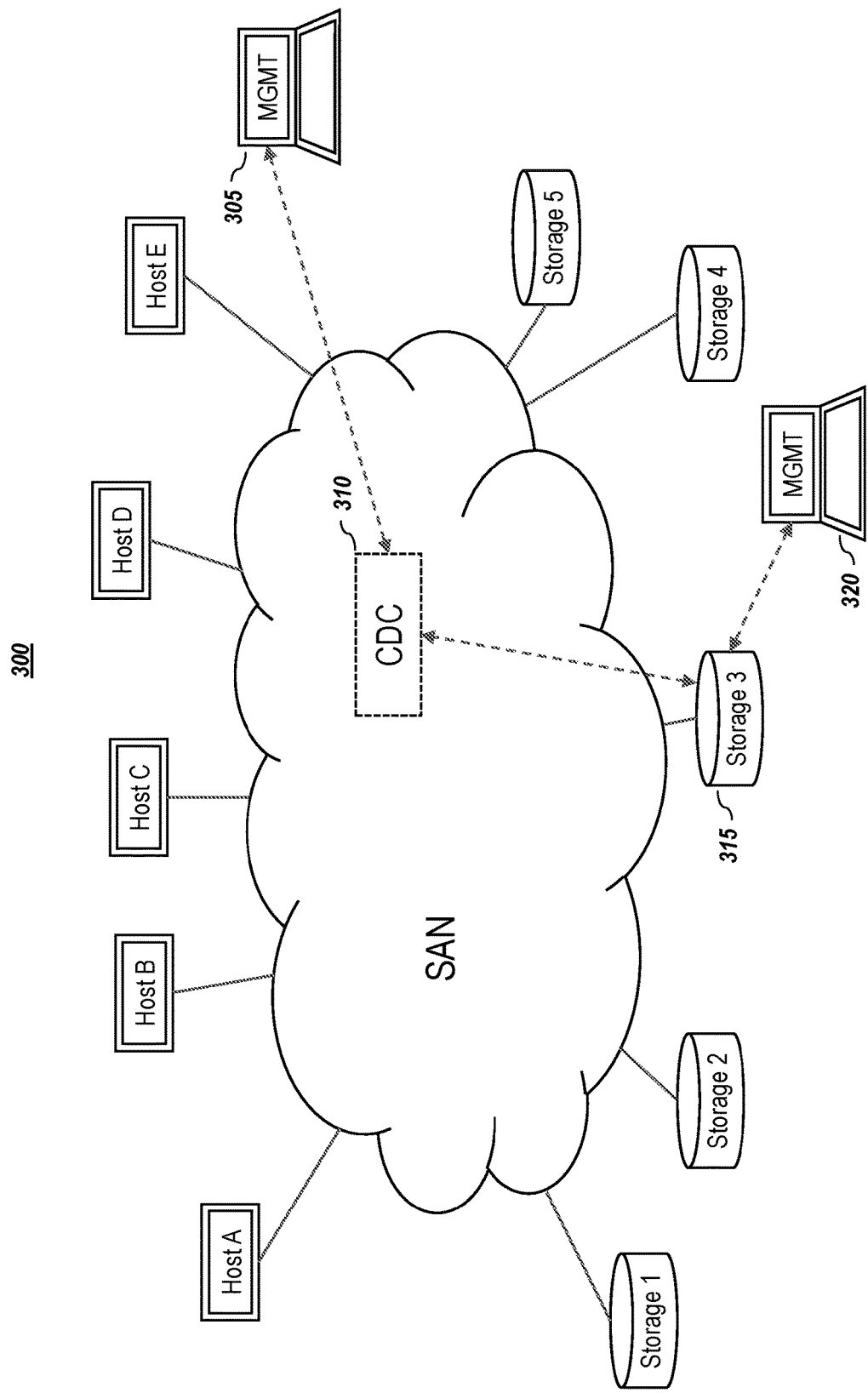
FIG. 3 depicts zoning management in an NVMe™-over Fabrics (NVMe-oF™) environment, according to embodiments of the present disclosure.

In NVMe-oF™, zoning configurations (i.e., zone groups) are maintained by the CDC. FIG. 3 depicts zoning management in an NVMe-oF™ environment, according to embodiments of the present disclosure. As illustrated, zone groups may be generated, activated, and deactivated by a SAN administrator through a management application 305 that interacts with the CDC 310, or by a storage subsystem 315, via a management interface 320, through in-band management commands. A subsystem 315 may generate zone group(s) as a result of storage allocation configurations defined on the device by a storage administrator via a management interface 320.

When a zone group is created on the CDC 310 by a SAN administrator through a management application, the zone group originator is the CDC's NQN. When a zone group is created on the CDC by a subsystem through in-band management commands, the zone group originator is the subsystem's NQN.

Figure 5:
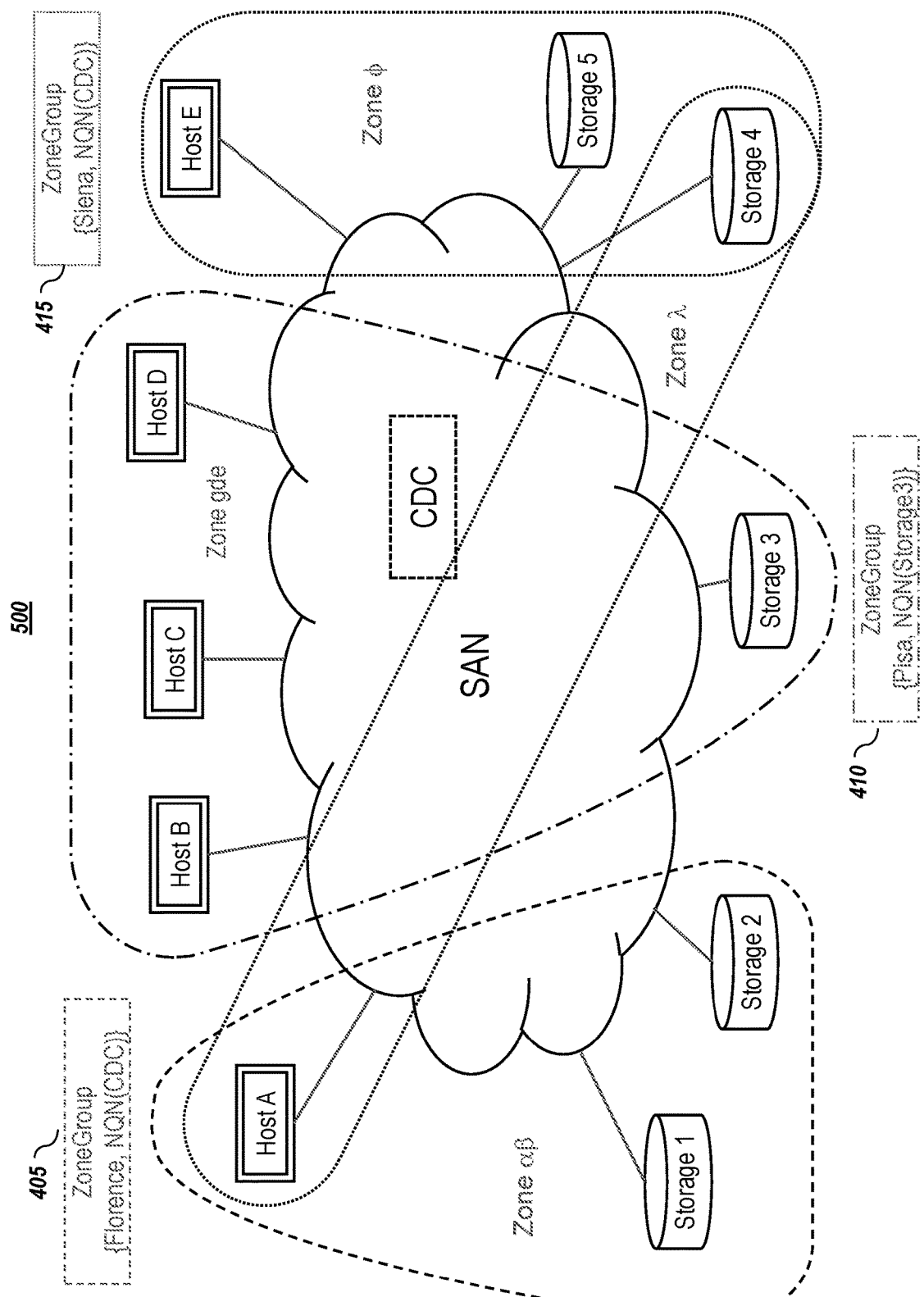
FIG. 5 graphically depicts the zoning configuration of Table 1, according to embodiments of the present disclosure.

For example, considering the zoning configuration defined in Table 1, which is shown in FIG. 4, and is represented graphically in FIG. 5, zone groups {Florence, NQN(CDC)} 405 and {Siena, NQN(CDC)} 415 have been created on the CDC by a SAN administrator through a management application and have NQN(CDC) as zone group originator, while ZoneGroup {Pisa, NQN(Storage3)} 410 have been created on Storage 3 and has NQN(Storage3) as zone group originator.

As noted above, zone groups may be identified by the pair {ZoneGroup Name, ZoneGroup Originator NQN}, which can be up to 256 bytes long. As will be discussed in more detail below, this identifier size—256 bytes—is too large to work directly with the command structure for NVMe® environments.

Embodiments of subsystem-driven zoning (SDZ) for NVMe® environments may be based on zone groups, have analogous operations to FC Peer Zoning, and are implemented as NVMe® operations:

(1) Get Active ZoneGroup (GAZ), to read a zone group from the active zone(s) database (ZoneDB Active);
(2) Add/Replace Active ZoneGroup (AAZ), to write a zone group in the ZoneDBActive; and
(3) Remove Active ZoneGroup (RAZ), to delete a zone group in the ZoneDBActive.

The information carried in the payloads associated with these operations is shown in FIG. 6. FIG. 6 depicts subsystem-driven zoning operations payloads, according to embodiments of the present disclosure. The Get Active ZoneGroup (GAZ) operation 600 comprises a GAZ Request 602, in which a zone group identifier 604 is submitted to the CDC, which returns in a GAZ Response 610, a corresponding zone group definition 614 from the active zone database. The Add/Replace Active ZoneGroup (AAZ) operation 620 comprises an AAZ Request 622, in which the zone group definition 624 is provided to the CDC for adding or replacing, and the CDC returns operational status of the addition or replacement of the zone group in the active zone database by sending an AAZ Response 630. Finally, the Remove Active Zone (RAZ) operation 640 comprises a RAZ Request 642 that includes a zone group name 644 that is to be deleted from the active zone database, and the CDC returns operational status of the deletion of the zone group from the active zone set by sending a RAZ Response 650.

Figure 7:
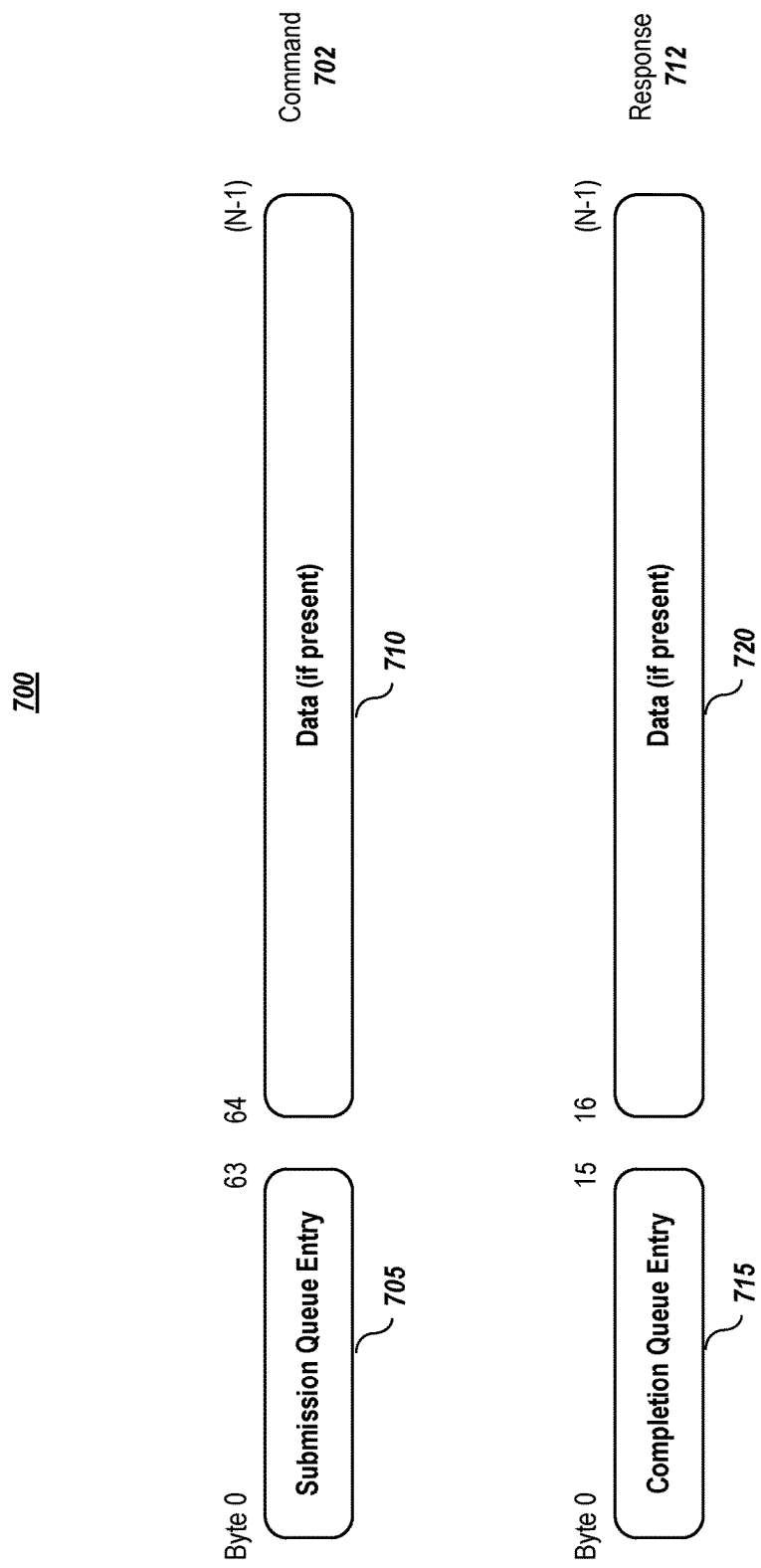
FIG. 7 graphically depicts NVMe® capsule structures, according to embodiments of the present disclosure.

To match the functionality of Fibre Channel, these operations should be supported in NVMe® environments and implemented using NVMe's command/response structure 700. The general structure 700 of NVMe® capsules are shown in FIG. 7. NVMe® supports transfer of data in the direction of the command (host-to-controller data transfer, e.g., a "write" operation) or in the direction of the response (controller-to-host data transfer, e.g., a "read" operation), but not both. A command capsule 702 comprises a submission queue entry 705 and may include a payload transfer 710. Similarly, a response capsule 712 comprises a completion queue entry 715 and may include a data/payload transfer 720. It shall be noted that, while although the byte count for the command data/payload transfer is depicted as continuing from the submission queue entry or completion queue entry, the data transfer may, in one or more embodiments, occur separate from transmission of the submission queue entry or completion queue entry (e.g., at some point before or after transmission of the submission queue entry or completion queue entry).

Figure 8:
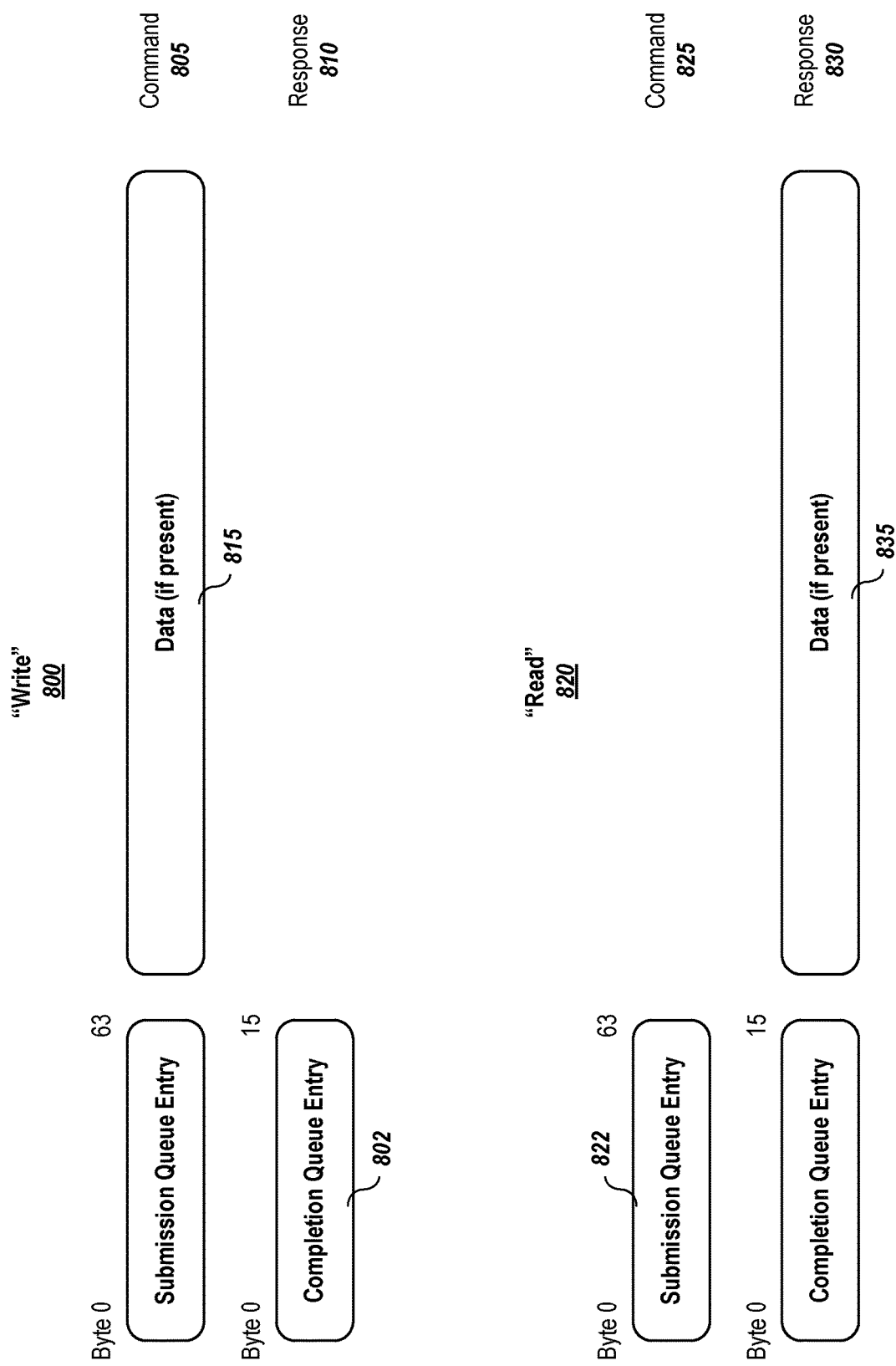
FIG. 8 graphically depicts NVMe-oF™ "write" command and "read" command capsule structures, according to embodiments of the present disclosure.

There are two supported types of operation: host-to-controller data transfer and controller-to-host data transfer, which are analogous to the transfers for write operations and read operation, respectively. As illustrated in FIG. 8, for a "write" operation 800, data (if any) 815 is present in the command 805; there is no data in the response 810. Note also that there is a limited maximum data size in the Completion Queue Entry (CQE) 802. A CQE 802 has a size of 16 bytes. For a "read" operation 820, data 835 (if any) is present in the response 830; there is no data in the command 825. Note also that there is a limited maximum data size in the Submission Queue Entry (SQE) 822. An SQE 822 has a size of 64 bytes. It should be noted that, in one or more embodiments, the data may be communicated in a separate data channel related to the command, but note that the data flow is limited in direction of the command (i.e., for a "write" command, the data flow is a host-to-controller data transfer, and for a "read" command, the data flow is a controller-to-host data transfer).

Note that this structure—unlike the Fibre Channel protocol which supports bidirectional transfers of data—does not support bidirectional transfers. The lack of bidirectional transfer is one of the limitations that exist in NVMe® environments. Note also that the data size limits for the SQE and CQE are also constraints.

Figure 9:
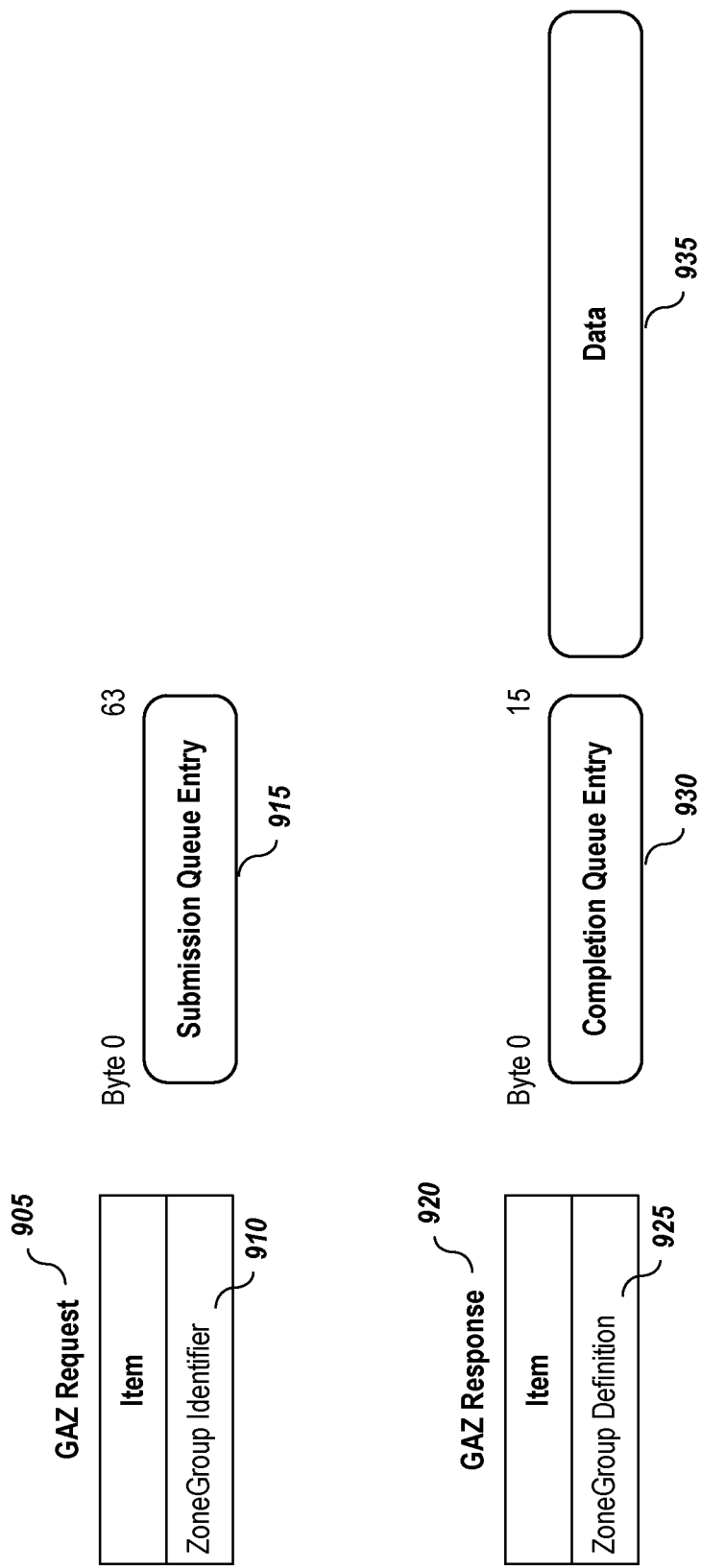
FIG. 9 depicts the Get Active ZoneGroup operation mapping issue given the one direction transfer command structure and SQE size limitation, according to embodiments of the present disclosure.

This structure 700/800 and 820 makes direct support of certain operations difficult. Consider, by way of illustration, a Get Active ZoneGroup (GAZ) operation, depicted in FIG. 9. The depicted operation comprises two elements: a GAZ Request 905 to supply the ZoneGroup Identifier 910 to the CDC, and a GAZ Response 900 to supply the corresponding ZoneGroup definition data. In NVMe®, the Get Active ZoneGroup (GAZ) operation is a "read" operation that includes a ZoneGroup identifier 910 to read that zone group. However, as already stated, zone groups are identified by the pair {ZoneGroup Originator, ZoneGroup Name}, which can be up to 256 bytes and therefore cannot fit within a Submission Queue Entry 915.

Given the limitations discussed above, there is a clear need for solutions that enable implementation of subsystem-driven zoning operations via NVMe® commands.

B. Subsystem-Driven Zoning Embodiments

Figure 10:
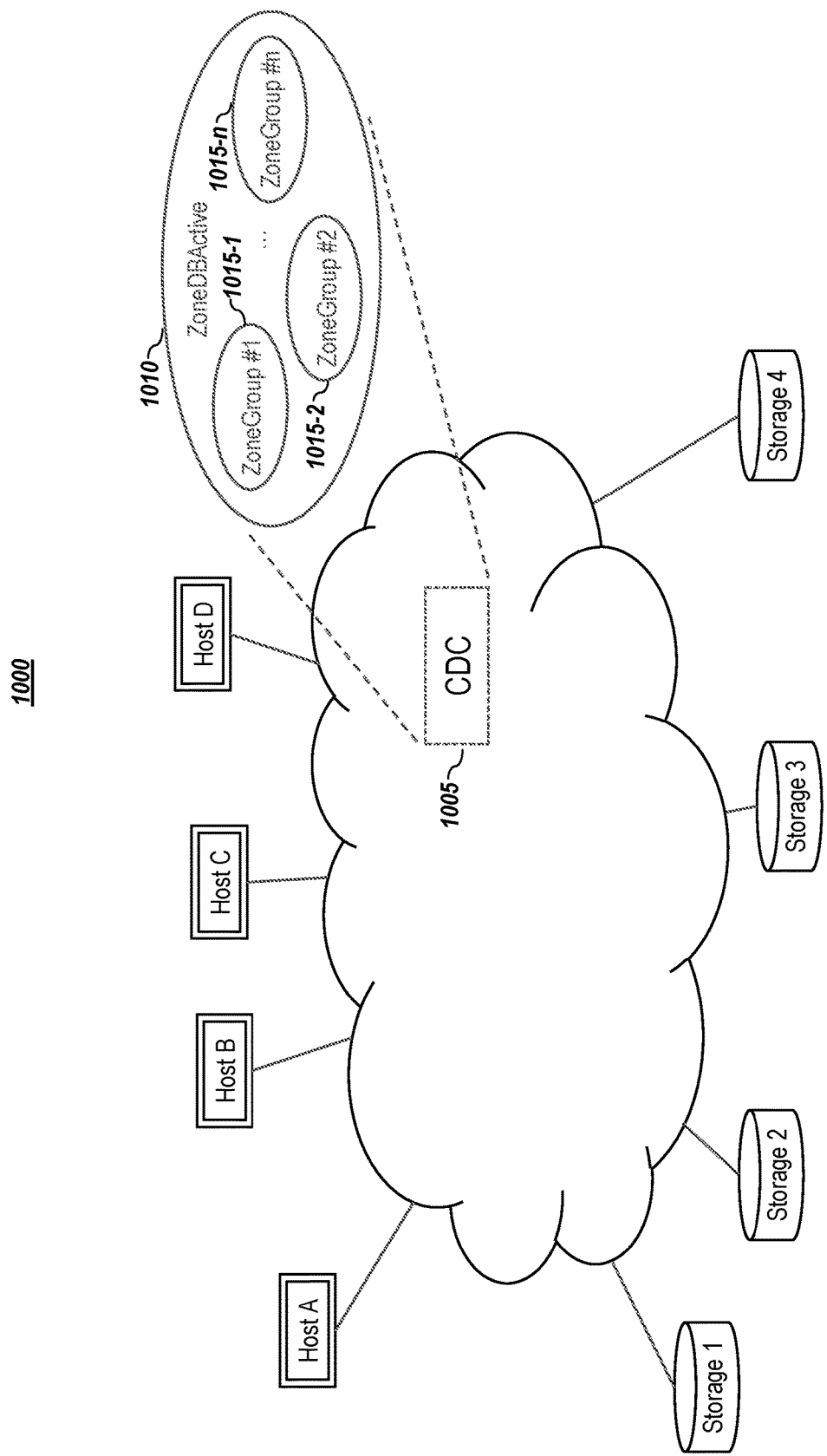
FIG. 10 depicts at storage area network (SAN) with a discovery controller, according to embodiments of the present disclosure.

Consider, by way of illustration, the SAN 1000 depicted in FIG. 10. The CDC 1005 of the network 1000 includes a zoning database or datastore 1010, which represents zone group(s) that are enforced in the network 1000. In the depicted example, zone group 1005-1 through zone group 1005-n are currently active. In one or more embodiments, a zone group may include one or more zones, members, aliases, attributes, etc. Note that, unlike Fibre Channel zoning that only allows one active access control policy to be active at once, more than one zone group may be active at a time, which provides greater granularity over the active zone groups. One zone group may be removed or changed without affecting the activation state of other active zone groups. Note that, in one or more embodiments, the ZoneDBActive 1010 facilitates enforcement actions, such as log page and event notifications filtering, and network-level restrictions, among other actions. The zone groups in the ZoneDBActive may be activated and enforced by the CDC in terms of filtering the discover information provided to hosts and storage elements.

Figure 11:
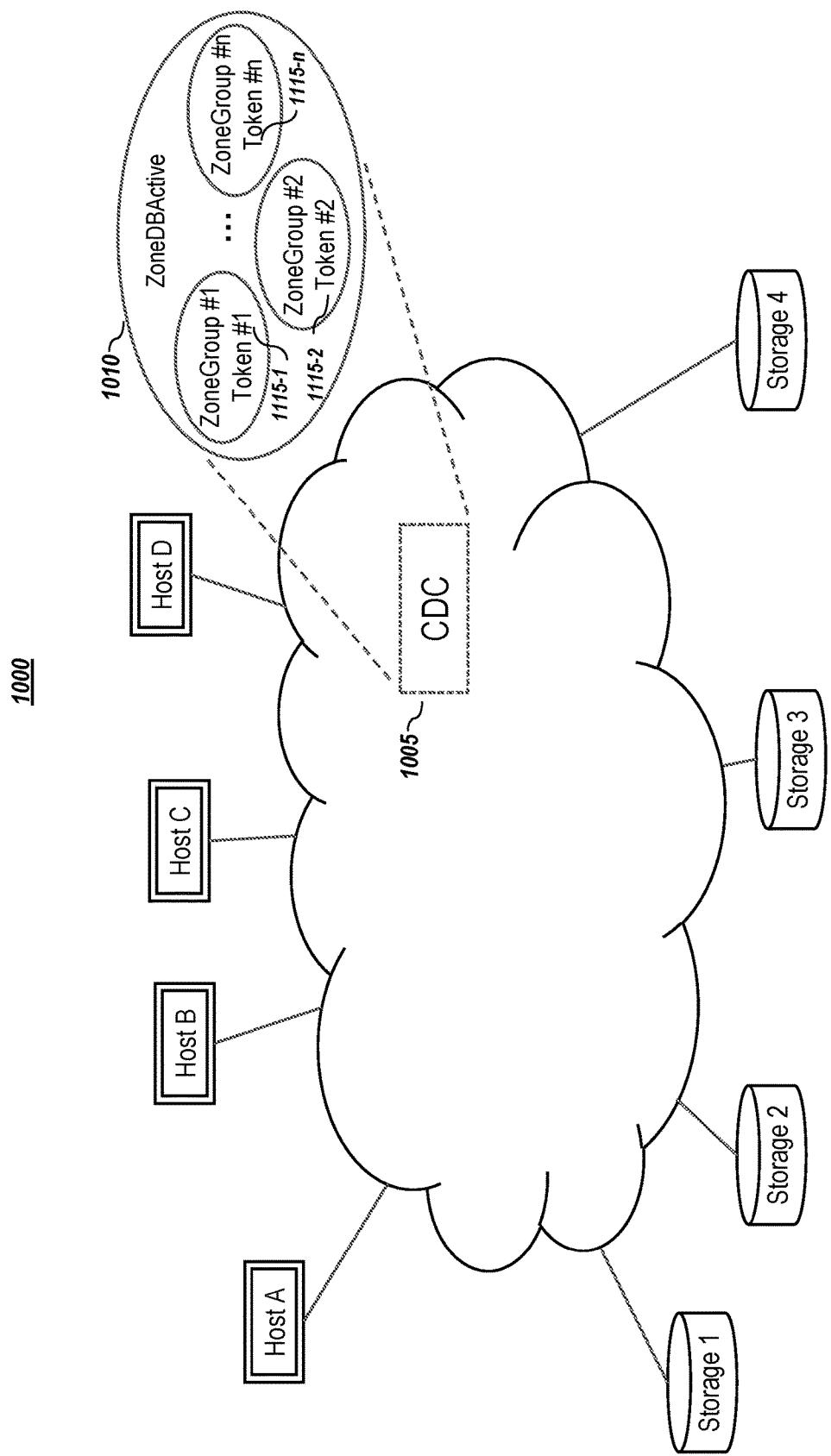
FIG. 11 depicts at storage area network (SAN) with a discovery controller that maintains a correlation between zone group identifiers and tokens, according to embodiments of the present disclosure.

In one or more embodiments, part of the solution to overcome the limitations discussed in the prior section is to allow the CDC to maintain a unique token, such as a 32-bit token, to identify a zone group. Consider the graphical representation, provided by way of illustration, in FIG. 11. FIG. 11 depicts the SAN of FIG. 10; however, the CDC 1005 comprises a zoning database 1010 that includes a token identifier 1115-$x$ corresponding to each zone group. It shall be noted that the database(s) or table(s) that stores the correlation between token identifier and zone group identifier may be maintained in the zoning database 1010 or elsewhere. It shall also be noted that there need not be a one-to-one correspondence between zone group identifier 1015 and token identifier 1115. For example, a zone group may include a plurality of token identifiers, which may be maintained for a variety of purposes, including having different token identifiers for a zone group relative to different hosts, different subsystems, or both. It shall also be noted that a token identifier may change over time, except while it is in use to associate the multiple NVMe commands that implement a single zoning operation.

Embodiments also include defining three generic zoning commands, which may be used to implement three subsystem-defined zoning (SDZ) operations, GAZ, AAZ, and RAZ, which were discussed above. In one or more embodiments, the three generic zoning commands are:

(1) Fabric Zoning Lookup (FZL)—to retrieve a token associated with a specified ZoneGroup;
(2) Fabric Zoning Send (FZS)—to send zoning data to the CDC; and
(3) Fabric Zoning Receive (FZR)—to retrieve zoning data from the CDC.

FIG. 12 depicts a method for performing an operation, according to embodiments of the present disclosure. In one or more embodiments, for each zone group from a set of one or more zone groups, a datastore is maintained (1205) that correlates a token identifier to a zone group identifier for the zone group. As noted previously, in one or more embodiments, a zone group is a data structure maintained in a database (which may be the same datastore that stores the tokens or may be a different datastore) by a discovery controller (DC) (which may be the centralized discovery controller) that represents a set of one or more hosts that may access one or more storage subsystems. In one or more embodiments, the discovery controller, responsive to receiving a zoning lookup command comprising submission queue entry and data/payload transfer, in which the data transfer includes a zone group identifier for a zone group, uses (1210) the zone group identifier to verify if the identified zone group is locked, and:

(1) if the zone group is locked, returns an error status; and
(2) if the zone group is not locked: (a) uses the zone group identifier to obtain a token corresponding to the zone group identifier for the zone group; and (b) return the token for the zone group.

Figure 13:
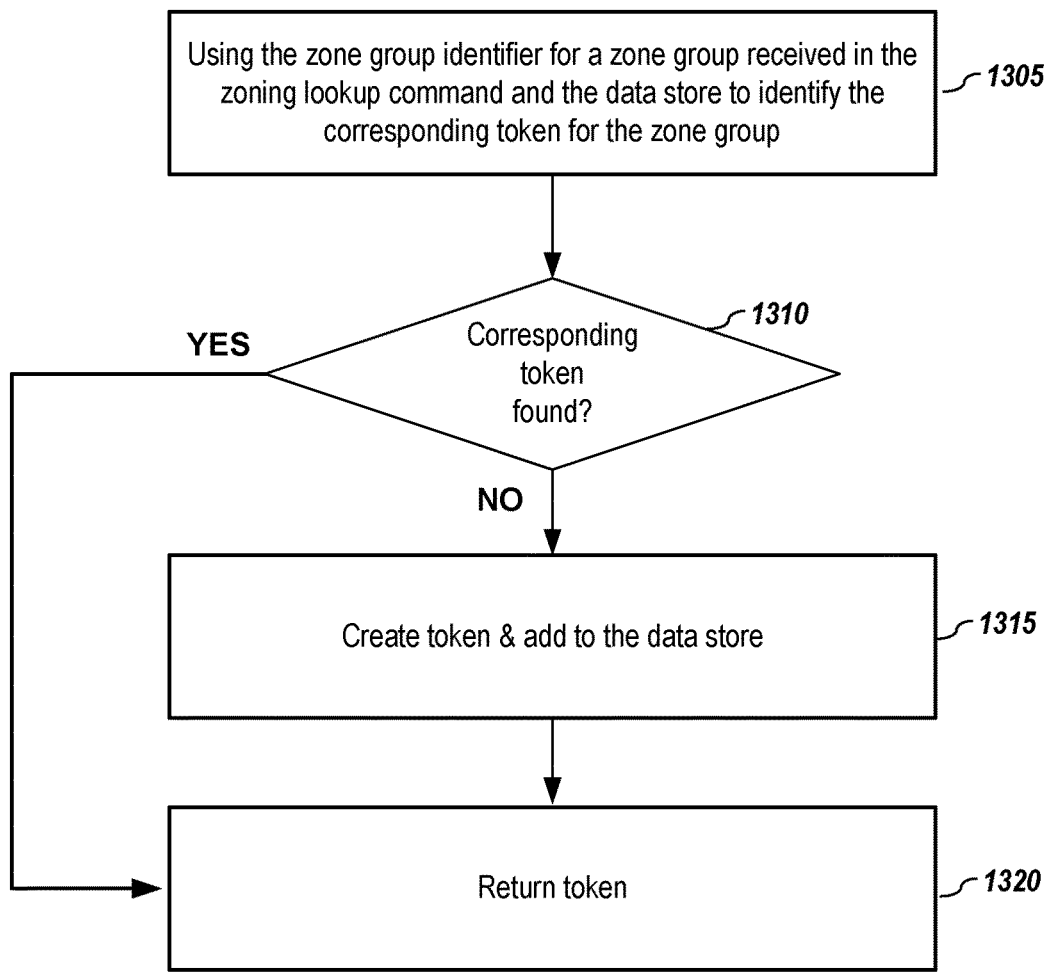
FIG. 13 depicts a method for returning a token related to a zone group, according to embodiments of the present disclosure.

In one or more embodiments, the step of using (1210) the zone group identifier to obtain a token corresponding to the zone group identifier for the zone group comprises the DC using the zone group identifier to look up the corresponding token in the datastore, such as the ZoneDBActive 1010 datastore in FIG. 11. It shall be noted that the discovery controller may assign a token to a zone group when it is first created or may assign a token to a zone group when requested. For example, as illustrated in the embodiment depicted in FIG. 13, the discovery controller uses (1305) the zone group identifier for a zone group received in the zoning lookup command and the datastore to identify a corresponding token for the zone group. If the discovery controller finds (1310) a token corresponding to the zone group identifier that was received in a zoning lookup command, the discovery controller returns (1320) the token. However, if the discovery controller does not find (1310) a token for the zone group identifier that was received in a zoning lookup command, the discovery controller may generate (1315) a token for the zone group and add the token to the datastore, in which the token is associated with the zone group identifier/zone group. It shall be noted that this step may also include adding a zone group and/or zone group identifier to the datastore if one is not present.

To address the data limit size of the SQE or CQE, in one or more embodiments, the token uses a memory size that fits within a SQE or CQE.

In one or more embodiments, responsive that zoning lookup command not being a remove zone group operation, the discovery controller receives a subsequent command that comprises a submission queue entry that includes the token identifier to identify the zone group. As illustrated in examples below, this subsequent command may be part of a Get Active ZoneGroup operation or an Add/Remove Active ZoneGroup operation.

In one or more embodiments, the zoning lookup command is a first command of two or more commands that form an operation (e.g., Get Active ZoneGroup operation) to obtain information about the zone group from the discovery controller, and the subsequent command(s) are a receive command that causes the discovery controller to return the information about the zone group.

In one or more embodiments, the zoning lookup command is a first command of two or more commands that form an operation (e.g., Add/Replace Active ZoneGroup operation) to make a change to the zone group, and the subsequent command(s) are a send command that causes the discovery controller to add the zone group to the database maintained by the discovery controller or to replace the zone group from the database maintained by the discovery controller.

In one or more embodiments, after receiving the initial zoning lookup command, the zone group may be locked. In such cases, the operation may be aborted and retried at a later time.

C. Example Operation Embodiments

1. Get Active ZoneGroup (GAZ) Operation Embodiments

Figure 14:
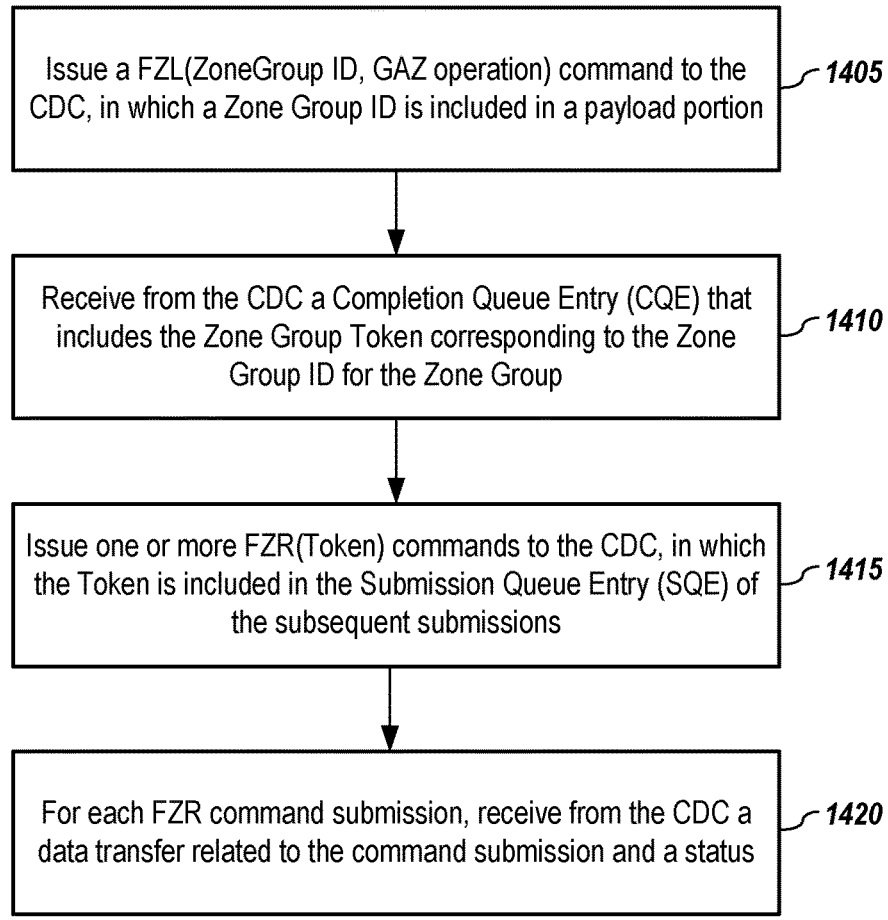
FIG. 14 depicts a method for performing a Get Active ZoneGroup (GAZ) operation, according to embodiments of the present disclosure.
Figure 15A:
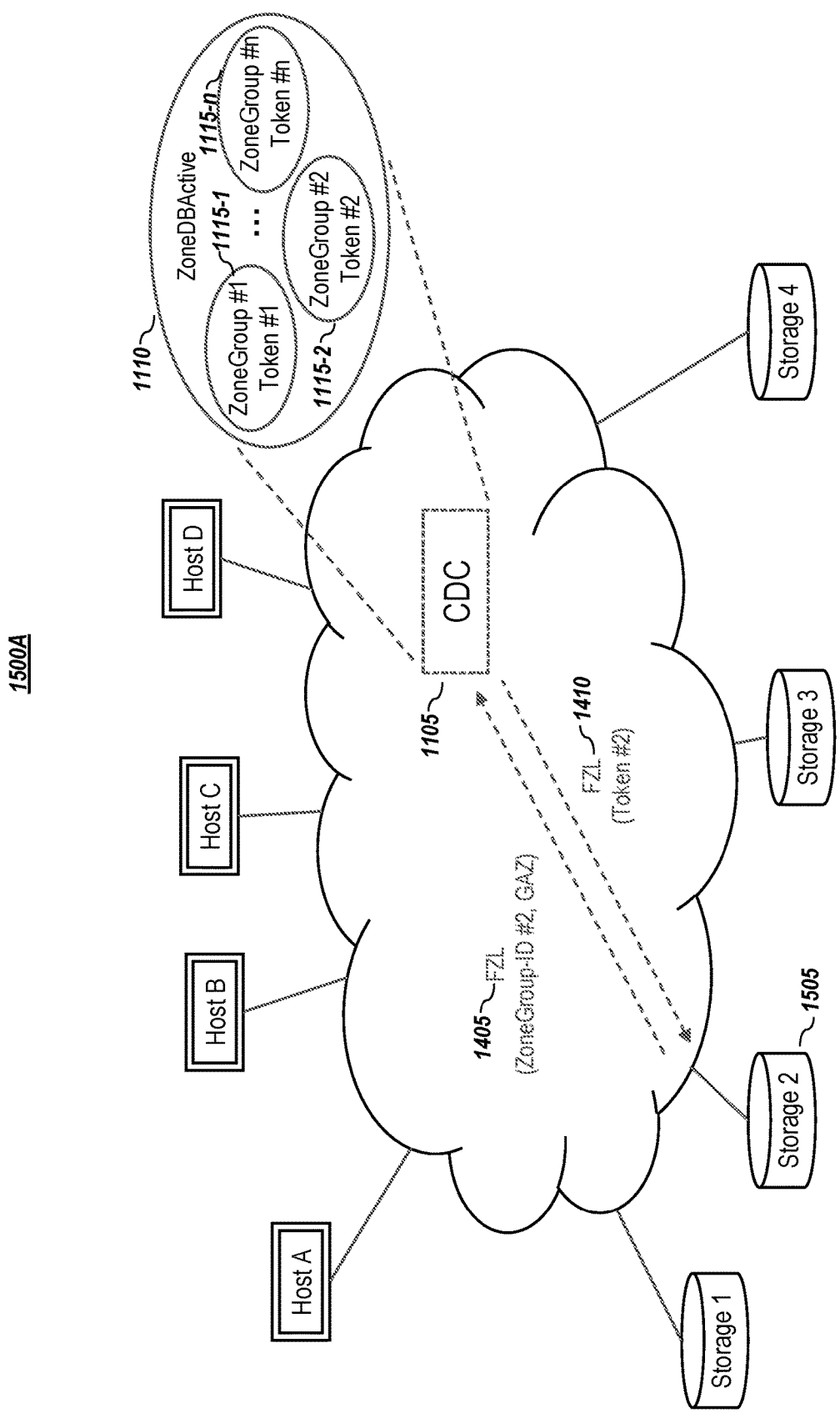
FIGS. 15A&B graphically depict two zoning commands for implementing a Get Active ZoneGroup (GAZ) operation, according to embodiments of the present disclosure.

FIG. 14 depicts a method for performing a Get Active ZoneGroup (GAZ) operation, according to embodiments of the present disclosure. FIGS. 15A&B graphically depict two zoning commands for implementing a Get Active ZoneGroup (GAZ) operation, according to embodiments of the present disclosure.

Figure 20:
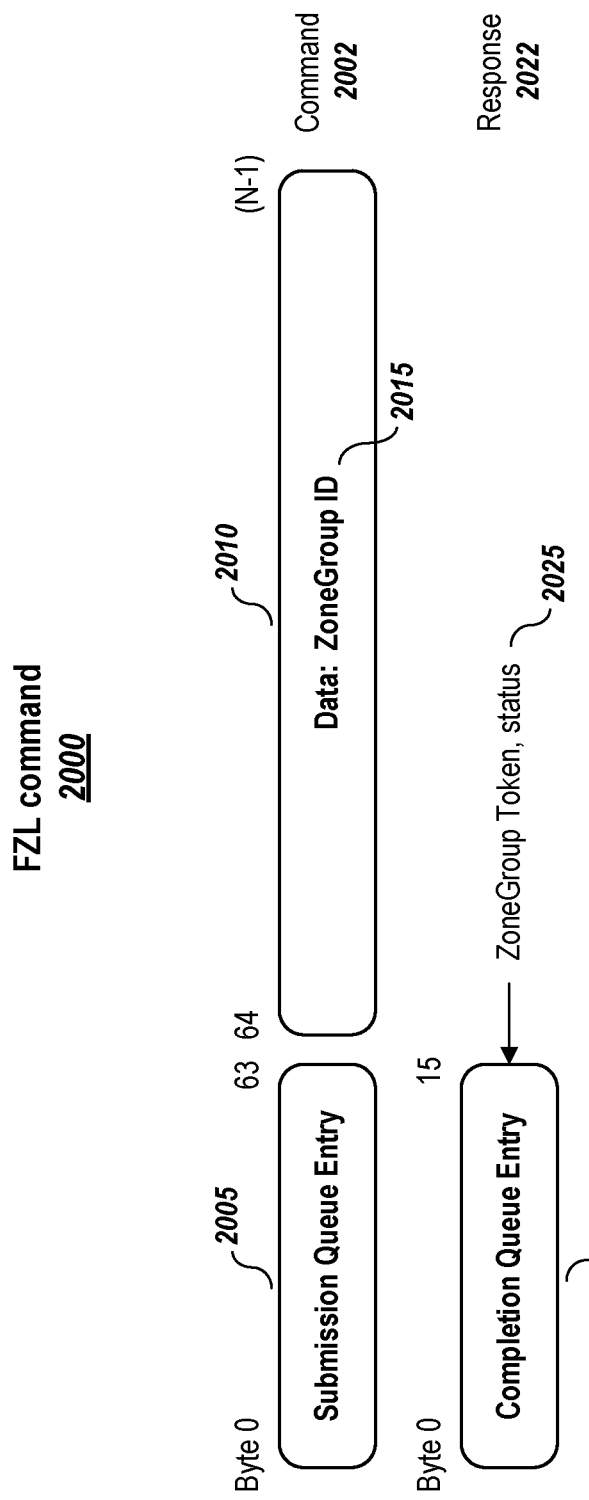
FIG. 20 graphically depicts a Fabric Zoning Lookup (FZL) command, according to embodiments of the present disclosure.

As shown in FIG. 14, the Get Active ZoneGroup operation commences by issuing (1405) a Fabric Zoning Lookup command, FZL (ZoneGroup ID, GAZ operation), to the discovery controller in order to retrieve a token associated with a zone group. FIG. 20 graphically depicts a FZL command 2000, according to embodiments of the present disclosure. As illustrated, the command 2002 includes a submission queue entry (SQE) 2005 and a data/payload transfer 2010. In this example, the payload portion 2010 of the FZL command includes the zone group identifier 2015 (in this example, ZoneGroup-ID #2). As noted previously, the data/payload transfer may alternatively occur in a communication channel.

In response to receiving the FZL command, the DC returns (1410) the zone group token in the FZL response along with the command status (e.g., successful). As shown in the embodiment depicted in FIG. 20, the response portion 2022 of the FZL command includes in the completion queue entry (CQE) portion 2020 the zone group token (in this example, Token #2) and the status.

These two steps 1405 and 1410 of the FZL command are graphically depicted in FIG. 15A. Storage 2 1505 sends to the CDC 1105 a FZL command 1405 with the zone group identifier (ZoneGroup-ID #2) included. The CDC 1105 uses the zone group identifier and its datastore 1110 to find the corresponding token, which it returns in the FZL response 1410.

Now that the storage (in this example Storage 2 1505) has the token, it has an identifier for the zone group that fits within a field in the SQE for the command, which can be used to complete the Get Active ZoneGroup operation.

Figure 15B:
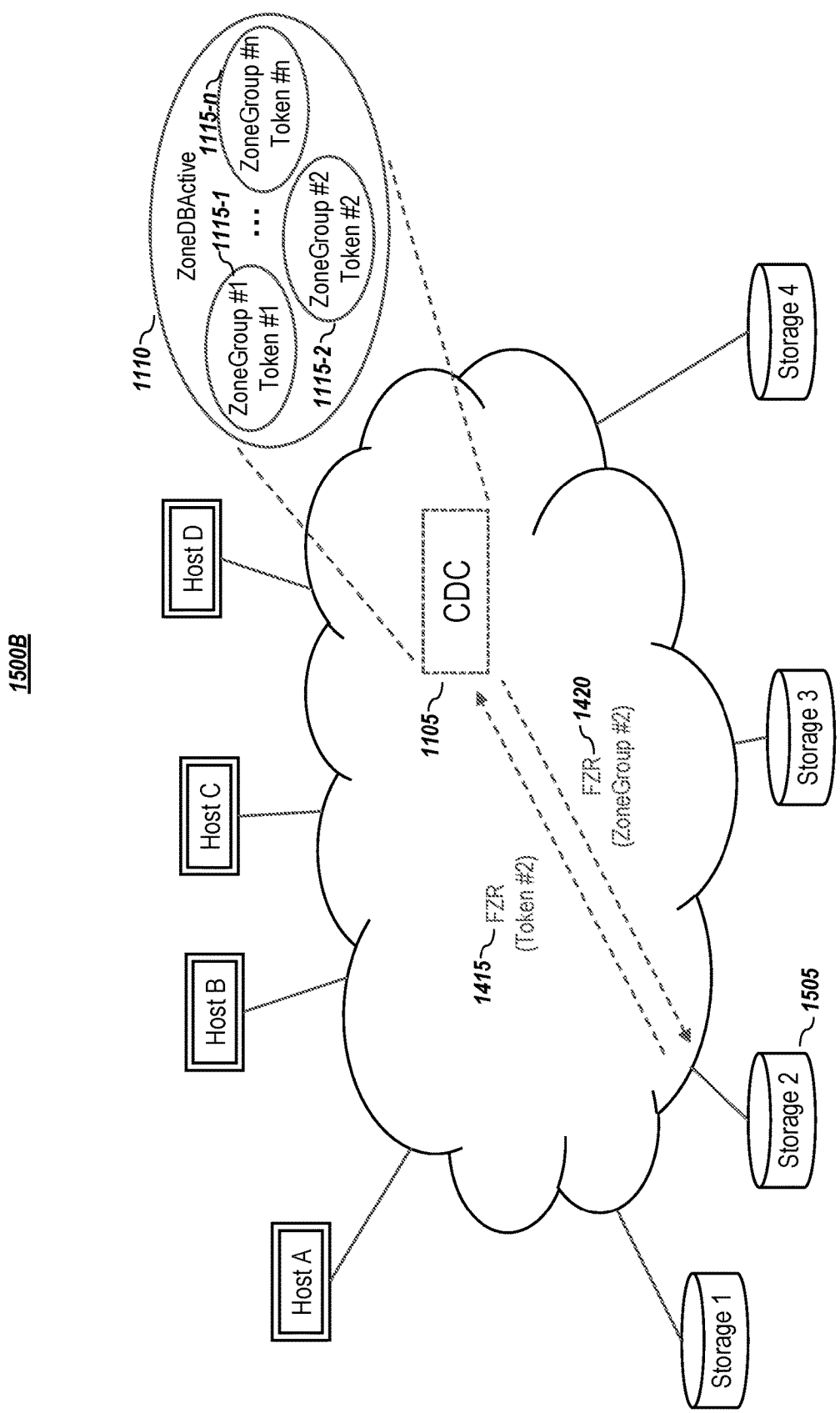

Referring to FIG. 14 and FIG. 15B, the storage (i.e., Storage 2) issues (1415) one or more Fabric Zoning Receive (FZR) commands, FZR (Token), to the discovery controller 1105. In one or more embodiments, multiple FZR commands may be used if the zone group definition is larger than the buffer size used in these command transfers; thus, the zone group definition may then be fragmented and transferred one fragment at a time through multiple FZR commands.

Figure 21:
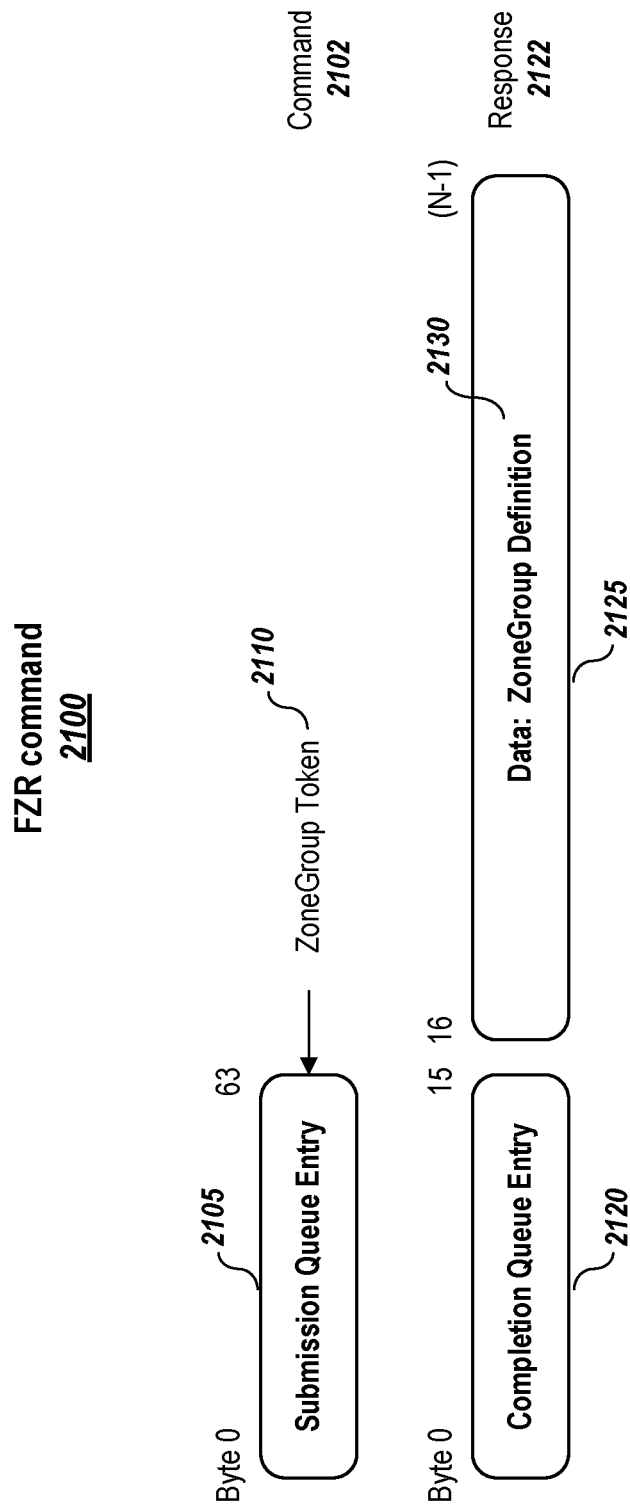
FIG. 21 graphically depicts a Fabric Zoning Receive (FZR) command, according to embodiments of the present disclosure.

FIG. 21 graphically depicts a FZR command 2100, according to embodiments of the present disclosure. As illustrated, the command 2102 includes a submission queue entry (SQE) portion 2105, in which the token is included for each submitted command. In this example, the SQE 2105 of the FZR command includes the zone group token 2110 (i.e., Token #2).

For each FZR command submission, the storage receives (1420) from the discovery controller a data transfer related to the command submission and a status. In one or more embodiments, an indicator (e.g., a bit) in the CQE specifies if the transferred zone group fragment is the last one. Returning to FIG. 21, the response portion 2122 of the FZR command 2100 comprises a completion queue entry (CQE) portion 2120 and a data/payload transfer portion 2125. In this example, the CQE portion 2120 includes the command status, and the payload transfer portion 2125 includes data about the zone group definition (in this case, zone group definition for Zone Group #2). In one or more embodiments, as noted above, the data may be sent via a communication channel. In such instances, a single FZR command may be sufficient.

2. Add/Replace Active ZoneGroup (AAZ) Operation Embodiments

Figure 16:
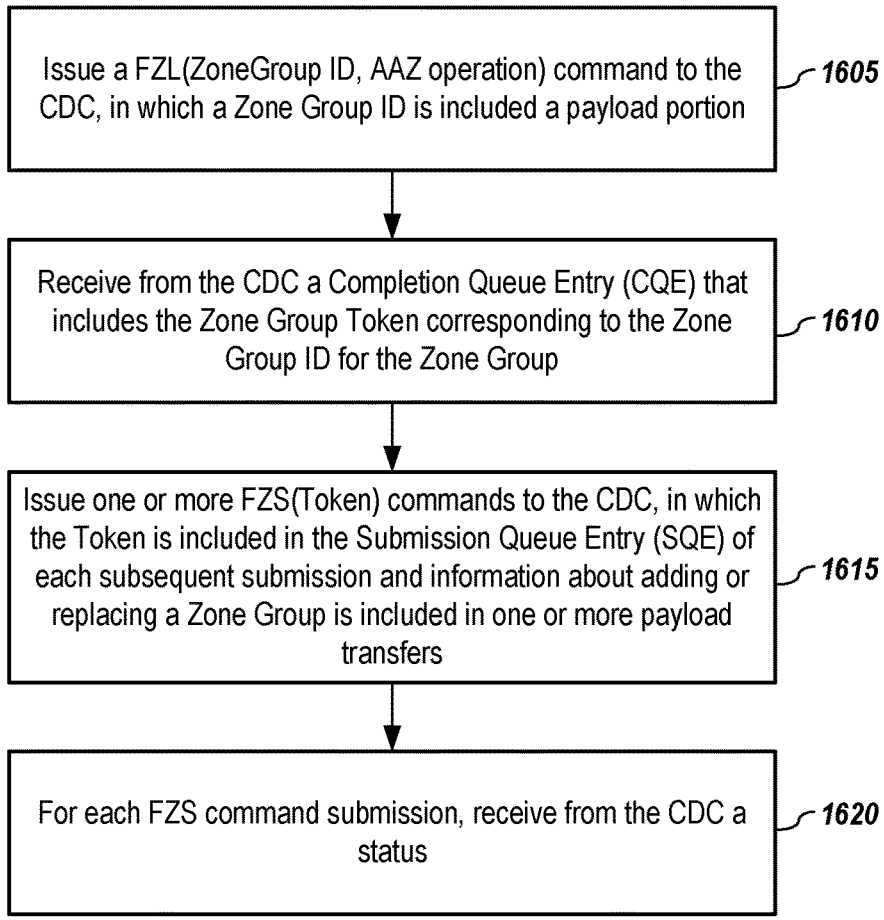
FIG. 16 depicts a method for performing an Add/Replace Active ZoneGroup (AAZ) operation, according to embodiments of the present disclosure.
Figure 17A:
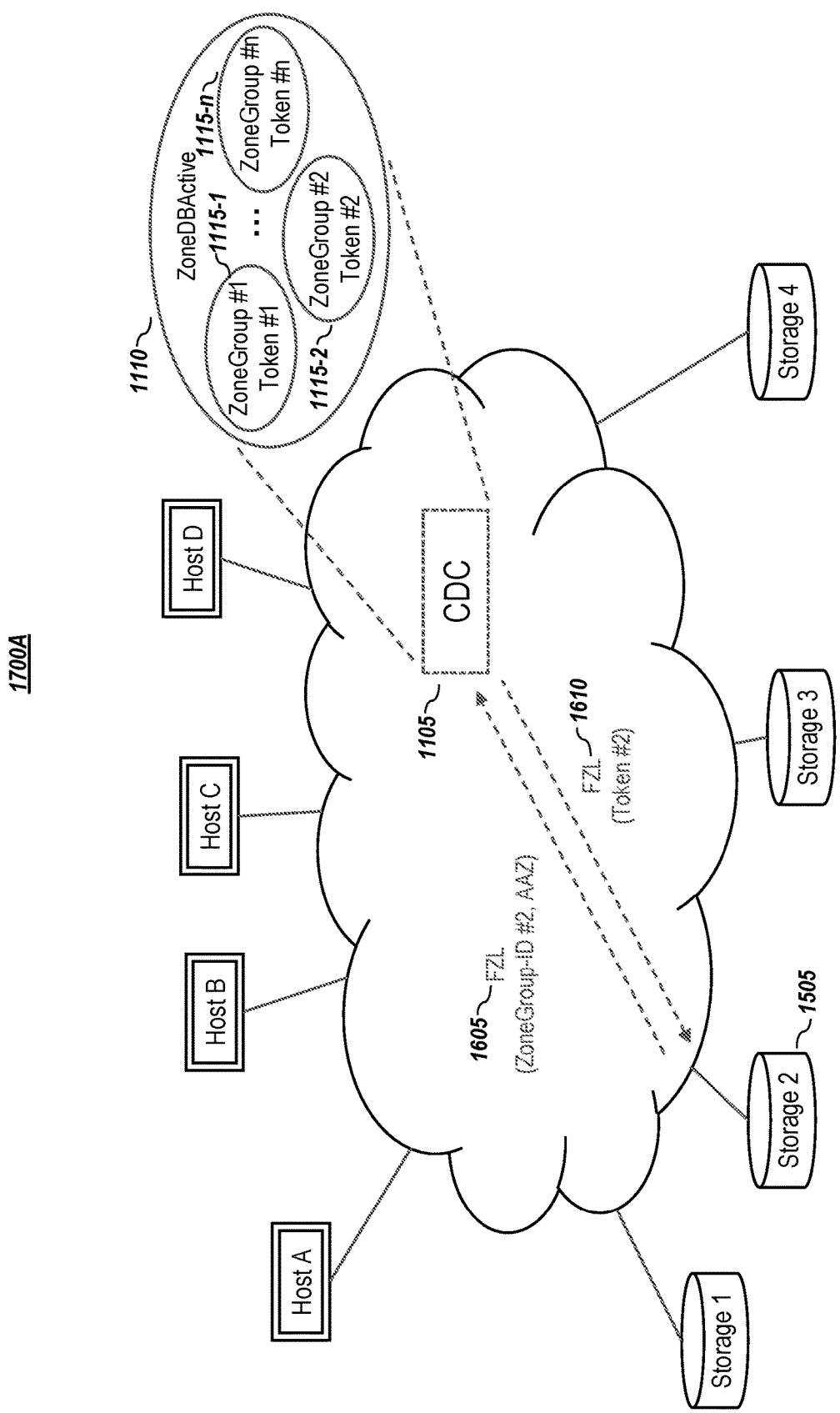
FIGS. 17A&B graphically depict two command processes for performing an Add/Replace Active ZoneGroup (AAZ) operation, according to embodiments of the present disclosure.

FIG. 16 depicts a method for performing an Add/Replace Active ZoneGroup (AAZ) operation, according to embodiments of the present disclosure. FIGS. 17A&B graphically depict two command processes for performing an Add/Replace Active ZoneGroup (AAZ) operation, according to embodiments of the present disclosure.

As show in FIG. 16, the Add/Replace Active ZoneGroup operation commences by issuing (1605) a Fabric Zoning Lookup command, FZL (ZoneGroup ID, AAZ operation), to the discovery controller in order to retrieve a token associated with a zone group. The zone group identifier may be included in a data transfer (i.e., 2010 in FIG. 20) of the FZL command. In response to receiving the FZL command, the discovery controller identifies the corresponding token, and the storage receives (1610) a CQE from the discovery controller that includes the zone group token in the FZL response along with the command status. These two steps, 1605 and 1610 of the FZL command, are graphically depicted in FIG. 17A. Storage 2 1505 sends to the CDC 1105 a FZL command 1605 with the zone group identifier (ZoneGroup-ID #2) included. The CDC 1105 uses the zone group identifier (ZoneGroup-ID #2) and its datastore 1110 to find the corresponding token (Token #2), which it returns in the FZL response 1610.

Storage 2 1505 now has the token identifier for the zone group that will fit within the a field in the SQE for a command, which can be used to complete the Add/Replace Active ZoneGroup operation.

Figure 17B:
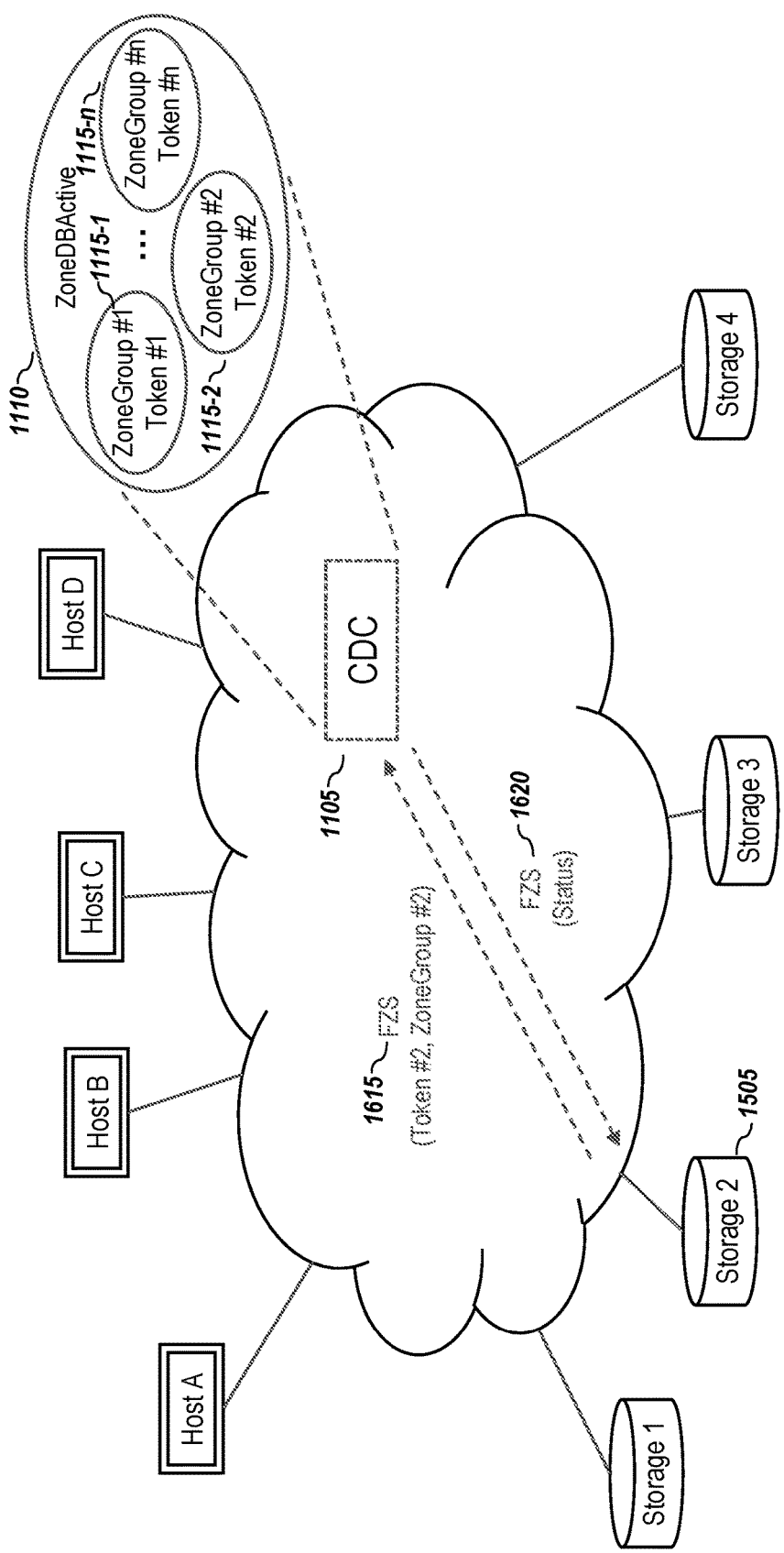
Figure 22:
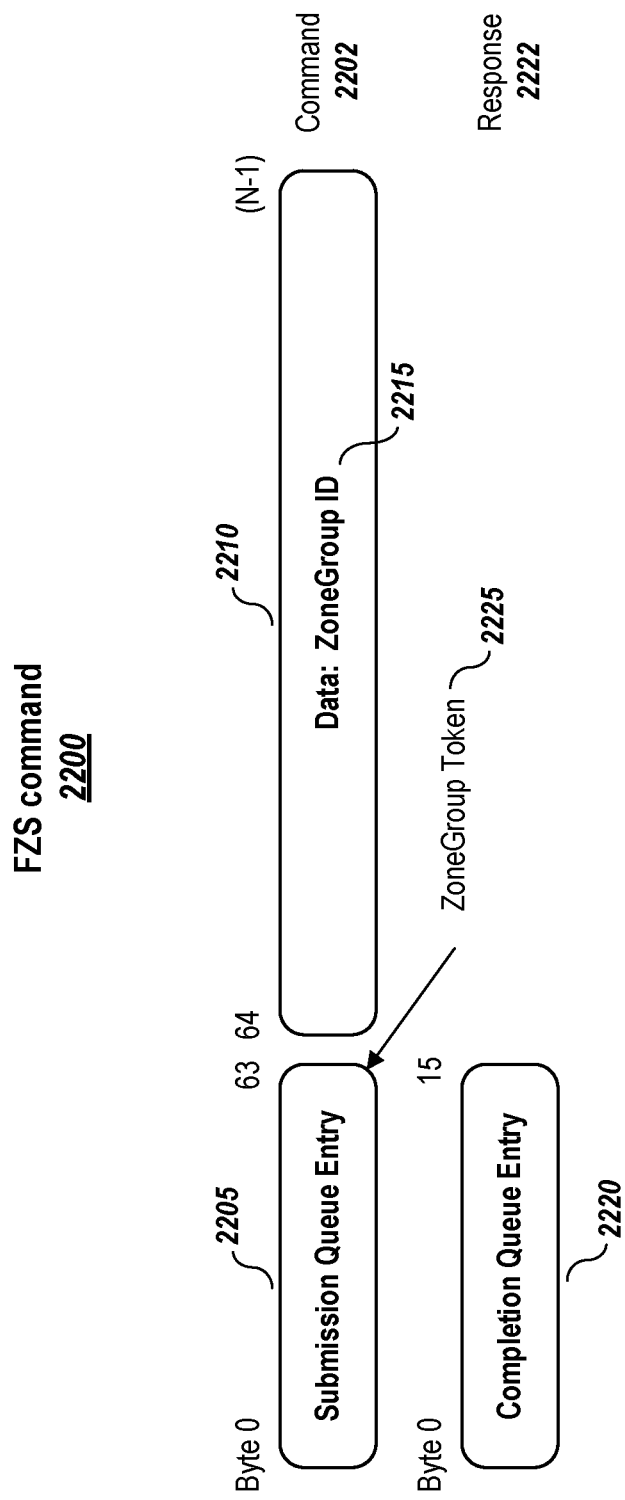
FIG. 22 graphically depicts a Fabric Zoning Send (FZS) command, according to embodiments of the present disclosure.

Referring to FIG. 16 and FIG. 17B, the storage (i.e., Storage 2) issues (1615) one or more Fabric Zoning Send (FZS) commands, FZS (Token, ZoneGroup), to the discovery controller 1105. In one or more embodiments, multiple FZS commands may be used if the zone group definition is larger than the buffer size used in these command transfers; thus, the zone group definition may then be fragmented and transferred one fragment at a time through multiple FZS commands. FIG. 22 graphically depicts a FZS command 2200, according to embodiments of the present disclosure. As illustrated, the command 2202 includes a submission queue entry (SQE) portion or submission 2205, in which the zone group token (i.e., Token #2) is included. In one or more embodiments, an indicator (e.g., a bit) in the SQE may be used to specify if the transferred zone group fragment is the last one.

For each FZS command submission, the storage receives (1620) from the discovery controller a response 2222 that comprises a CQE 2220 that includes a command status.

In one or more embodiments, the data/payload may be sent via a communication channel. In such instances, a single FZS command may be sufficient.

3. Remove Active ZoneGroup (RAZ) Operation Embodiments

Figure 18:
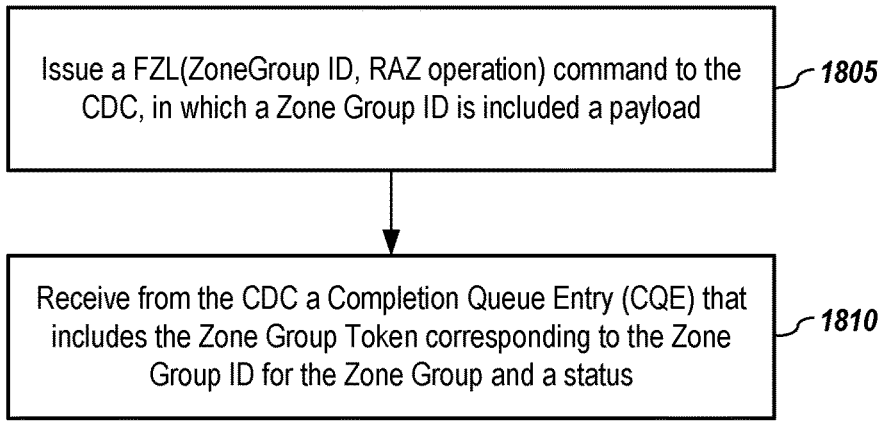
FIG. 18 depicts a method for performing a Remove Active ZoneGroup (RAZ) operation, according to embodiments of the present disclosure.
Figure 19:
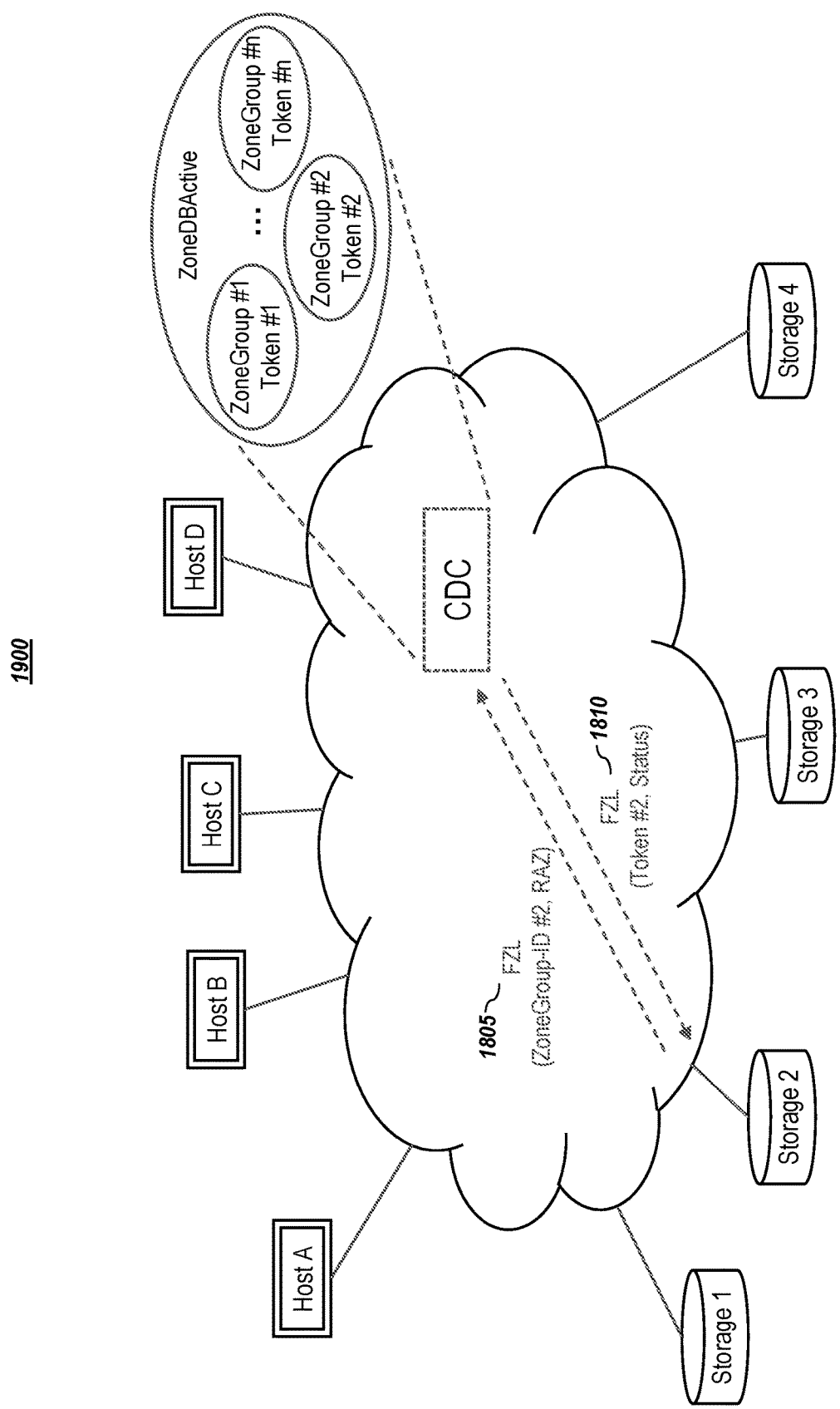
FIG. 19 graphically depicts a command process for performing a Remove Active ZoneGroup (RAZ) operation, according to embodiments of the present disclosure.

FIG. 18 depicts a method for performing a Remove Active ZoneGroup (RAZ) operation, according to embodiments of the present disclosure. FIG. 19 graphically depicts a command process for performing a Remove Active ZoneGroup (RAZ) operation, according to embodiments of the present disclosure. Note that, unlike the prior two operations, the Remove Active ZoneGroup operation may be implemented with one zoning command.

As show in FIG. 18 and FIG. 19, the Remove Active ZoneGroup operation commences by issuing (1805) a Fabric Zoning Lookup command, FZL (ZoneGroup ID, RAZ operation) (e.g., FZL 2000 illustrated in FIG. 20), to the discovery controller to notify it to delete the identified zone group. In response to receiving the FZL command, the discovery controller identifies the corresponding token for the specified zone group, executes the delete operation, and returns the token. Thus, the storage subsystem receives (1810) a CQE that includes the zone group token in the FZL response along with a status.

As illustrated in these example embodiments, bidirectional-like operations can be facilitated to allow for subsystem-driven zoning operations through unidirectional NVMe® commands:

(1) the Get Active ZoneGroup (GAZ) operation is decomposed in two Zoning commands, one FZL (ZoneGroup ID, GAZ operation) command followed by one or more FZR (Token) commands.

(2) the Add/Replace Active ZoneGroup (AAZ) operation is decomposed in two Zoning commands, one FZL (ZoneGroup ID, AAZ operation) command followed by one or more FZS (Token) commands; and (3) the Remove Active ZoneGroup (RAZ) operation is decomposed in one Zoning commands, one FZL (ZoneGroup ID, RAZ operation) command.

These operations are facilitated by augmenting the discovery controller zone group definition with unique tokens, which may be maintained and are accessible by the discovery controller.

One skilled in the art shall recognize that other operations may also be implemented in the same or similar manner.

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 23:
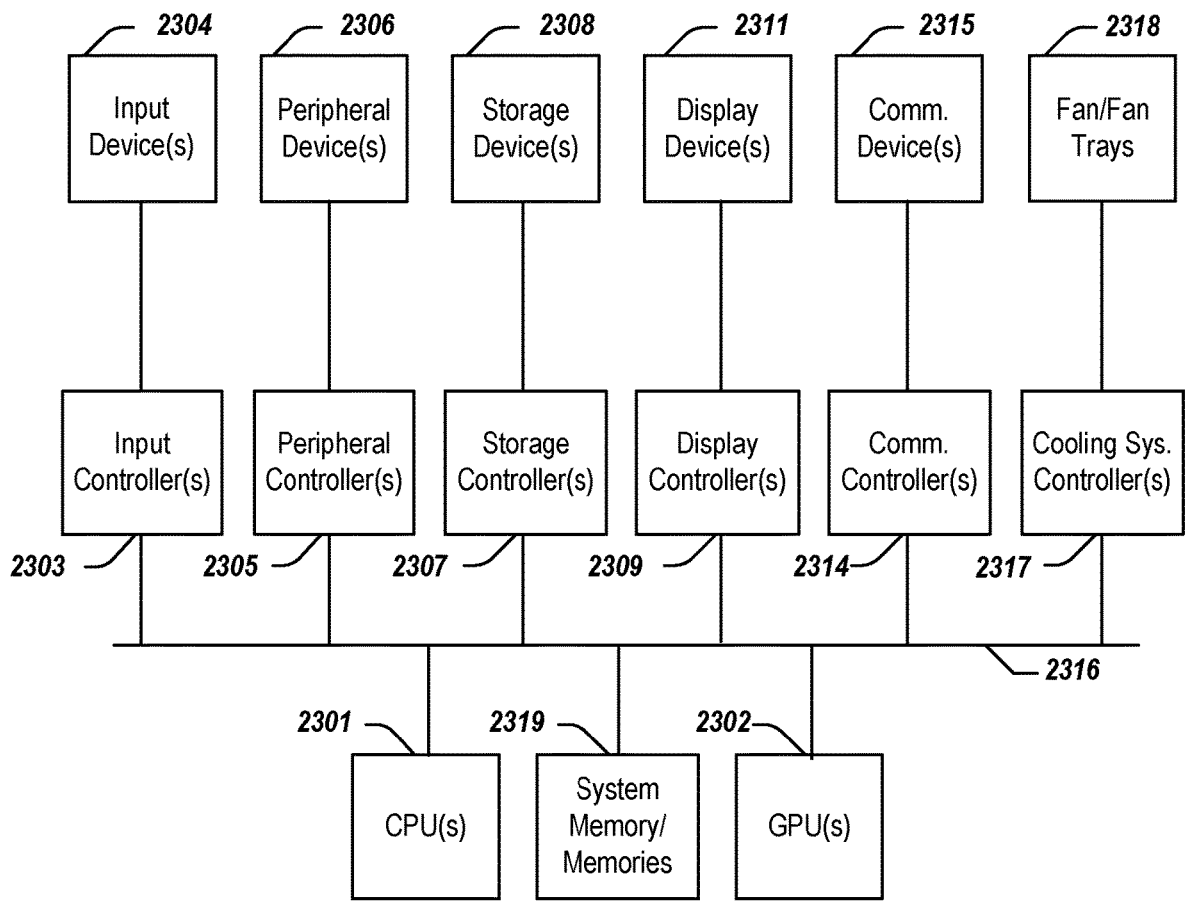
FIG. 23 depicts a simplified block diagram of an information handling system, according to embodiments of the present disclosure.

FIG. 23 depicts a simplified block diagram of an information handling system (or computing system), according to embodiments of the present disclosure. It will be understood that the functionalities shown for system 2300 may operate to support various embodiments of a computing system—although it shall be understood that a computing system may be differently configured and include different components, including having fewer or more components as depicted in FIG. 23.

As illustrated in FIG. 23, the computing system 2300 includes one or more CPUs 2301 that provides computing resources and controls the computer. CPU 2301 may be implemented with a microprocessor or the like and may also include one or more graphics processing units (GPU) 2302 and/or a floating-point coprocessor for mathematical computations. In one or more embodiments, one or more GPUs 2302 may be incorporated within the display controller 2309, such as part of a graphics card or cards. The system 2300 may also include a system memory 2319, which may comprise RAM, ROM, or both.

A number of controllers and peripheral devices may also be provided, as shown in FIG. 23. An input controller 2303 represents an interface to various input device(s) 2304, such as a keyboard, mouse, touchscreen, stylus, microphone, camera, trackpad, display, etc. The computing system 2300 may also include a storage controller 2307 for interfacing with one or more storage devices 2308 each of which includes a storage medium such as magnetic tape or disk, or an optical medium that might be used to record programs of instructions for operating systems, utilities, and applications, which may include embodiments of programs that implement various aspects of the present disclosure. Storage device(s) 2308 may also be used to store processed data or data to be processed in accordance with the disclosure. The system 2300 may also include a display controller 2309 for providing an interface to a display device 2311, which may be a cathode ray tube (CRT) display, a thin film transistor (TFT) display, organic light-emitting diode, electroluminescent panel, plasma panel, or any other type of display. The computing system 2300 may also include one or more peripheral controllers or interfaces 2305 for one or more peripherals 2306. Examples of peripherals may include one or more printers, scanners, input devices, output devices, sensors, and the like. A communications controller 2314 may interface with one or more communication devices 2315, which enables the system 2300 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2300 comprises one or more fans or fan trays 2318 and a cooling subsystem controller or controllers 2317 that monitors thermal temperature(s) of the system 2300 (or components thereof) and operates the fans/fan trays 2318 to help regulate the temperature.

In the illustrated system, all major system components may connect to a bus 2316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 24:
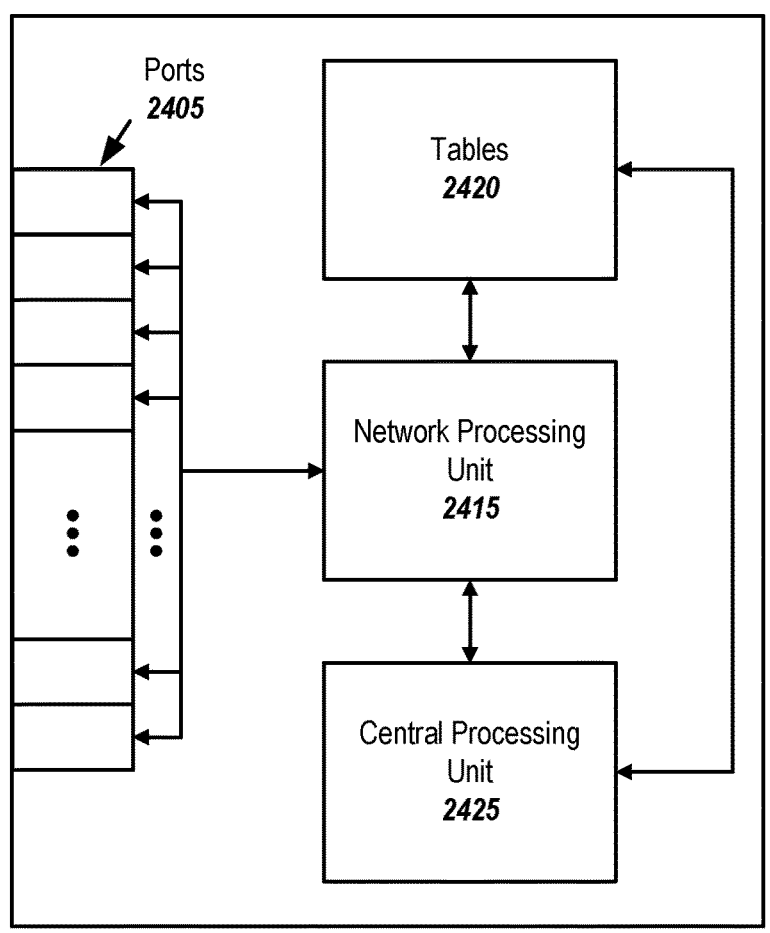
FIG. 24 depicts an alternative block diagram of an information handling system, according to embodiments of the present disclosure.

FIG. 24 depicts an alternative block diagram of an information handling system, according to embodiments of the present disclosure. It will be understood that the functionalities shown for system 2400 may operate to support various embodiments of the present disclosure—although it shall be understood that such system may be differently configured and include different components, additional components, or fewer components.

The information handling system 2400 may include a plurality of I/O ports 2405, a network processing unit (NPU) 2415, one or more tables 2420, and a CPU 2425. The system includes a power supply (not shown) and may also include other components, which are not shown for sake of simplicity.

In one or more embodiments, the I/O ports 2405 may be connected via one or more cables to one or more other network devices or clients. The network processing unit 2415 may use information included in the network data received at the node 2400, as well as information stored in the tables 2420, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method comprising:
   for each zone group from a set of one or more zone groups, maintaining a datastore that correlates a token to a zone group identifier for the zone group, in which a zone group is a data structure maintained in a database that represents a set of one or more hosts that may access one or more storage subsystems;
   responsive to receiving a zoning lookup command comprising a submission queue entry and a payload transfer, in which the payload transfer includes a zone group identifier for a zone group:
      using the zone group identifier to obtain a token corresponding to the zone group identifier for the zone group; and
      returning the token for the zone group; and
   responsive to the zoning lookup command not being a remove zone group operation, receiving one or more subsequent commands comprising a submission queue entry that comprises the token to identify the zone group.

2. The processor-implemented method of claim 1 wherein the step of using the zone group identifier to obtain a token corresponding to the zone group identifier for the zone group comprises:
   using the zone group identifier to look up the corresponding token in the datastore.

3. The processor-implemented method of claim 2 further comprising:
   responsive to the datastore not having a token corresponding to the zone group identifier for the zone group:
      generating a token for the zone group; and
      associating the token with the zone group identifier or zone group in the datastore.

4. The processor-implemented method of claim 1 wherein:
   the zone group identifier requires more memory size than is available to fit within the submission queue entry and the token has a memory size that fits within a completion queue entry and within the submission queue entry.

5. The processor-implemented method of claim 1 wherein:
   the zoning lookup command is a first command of a plurality of commands that form an operation to obtain information about the zone group from a discovery controller; and
   the one or more subsequent commands are a receive command or commands that cause the discovery controller to return the information about the zone group.

6. The processor-implemented method of claim 1 wherein:
   the zoning lookup command is a first command of a plurality of commands that form an operation to create or make a change to the zone group; and
   the one or more subsequent commands are a send command or commands that cause a discovery controller to add the zone group to the datastore maintained by the discovery controller or to change the zone group.

7. The processor-implemented method of claim 1 further comprising:
   locking the zone group subsequent to receiving the zoning lookup command, if not already locked.

8. The processor-implemented method of claim 1 further comprising:
   unlocking the zone group after receiving at least one of the one or more subsequent commands that comprises the submission queue entry that includes the token that identifies the zone group.

9. The processor-implemented method of claim 1 wherein the datastore and the database maintained by a discovery controller are a same datastore.

10. A processor-implemented method comprising:
    sending a zoning lookup command comprising a submission queue entry and a payload transfer, in which the payload transfer includes a zone group identifier for a zone group, to a discovery controller that, for each zone group from a set of one or more zone groups, maintains a datastore that correlates a token to zone group identifier for a zone group, in which a zone group is a data structure maintained in a database by the discovery controller that represents a set of one or more hosts that may access one or more storage subsystems;
    receiving, in a completion queue entry from the discovery controller, a token corresponding to the zone group identified by the zone group identifier in the payload transfer; and
    responsive to the zoning lookup command not being a remove zone group operation, sending one or more subsequent commands to the discovery controller that comprise a submission queue entry that includes the token to identify the zone group.

11. The processor-implemented method of claim 10 wherein the discovery controller uses the zone group identifier from the submission queue entry of the zoning lookup command to obtain the token corresponding to the zone group identifier for the zone group by using the zone group identifier to look up the corresponding token in the datastore.

12. The processor-implemented method of claim 10 wherein:
    the zone group identifier requires more memory size than is available to fit within a field of the submission queue entry and the token has a memory size that fits within the completion queue entry and the submission queue entry.

13. The processor-implemented method of claim 10 wherein:
    the zoning lookup command is a first command of a plurality of commands that form an operation to obtain information about the zone group from the discovery controller; and
    the one or more subsequent commands are a receive command or commands that cause the discovery controller to return the information about the zone group.

14. The processor-implemented method of claim 10 wherein:

the zoning lookup command is a first command of a plurality of commands that form an operation to create or make a change to the zone group; and the one or more subsequent commands are a send command that cause the discovery controller to add the zone group to the database maintained by the discovery controller or to change the zone group.

15. An information handling system comprising:

one or more processors; and a non-transitory computer-readable medium or media comprising one or more sets of instructions which, when executed by at least one of the one or more processors, causes steps to be performed comprising:

for each zone group from a set of one or more zone groups, maintaining a datastore that correlates a token to a zone group identifier for the zone group, in which a zone group is a data structure maintained in a database that represents a set of one or more hosts that may access one or more storage subsystems;

responsive to receiving a zoning lookup command comprising a submission queue entry and a payload transfer, in which the payload transfer includes a zone group identifier for a zone group:

using the zone group identifier to obtain a token corresponding to the zone group identifier for the zone group; and returning the token for the zone group; and responsive to the zoning lookup command not being a remove zone group operation, receiving one or more subsequent commands comprising a submission queue entry that comprises the token to identify the zone group.

16. The information handling system of claim 15 wherein the non-transitory computer-readable medium or media further comprises one or more sequences of instructions which, when executed by at least one of the one or more processors, causes steps to be performed comprising:

responsive to the datastore not having a token corresponding to the zone group identifier for the zone group:

generating a token for the zone group; and associating the token with the zone group identifier or zone group in the datastore.

17. The information handling system of claim 15 wherein:

the zone group identifier requires more memory size than is available to fit within the submission queue entry and the token has a memory size that fits within a completion queue entry and submission queue entry.

18. The information handling system of claim 15 wherein:

the zoning lookup command is a first command of a plurality of commands that form an operation to obtain information about the zone group from a discovery controller; and the one or more subsequent commands are a receive command or commands that cause the discovery controller to return the information about the zone group.

19. The information handling system of claim 15 wherein:

the zoning lookup command is a first command of a plurality of commands that form an operation to create or make a change to the zone group; and the one or more subsequent commands are a send command or commands that cause a discovery controller to add the zone group to the datastore maintained by the discovery controller or to change the zone group.

20. The information handling system of claim 15 wherein the non-transitory computer-readable medium or media further comprises one or more sequences of instructions which, when executed by at least one of the one or more processors, causes steps to be performed comprising:

checking if the zone group associated with the zone group identifier in the zoning lookup command is locked;

responsive to the zone group being locked, return an error status; and responsive to the zone group not being locked, performing the steps of:

using the zone group identifier to obtain a token corresponding to the zone group identifier for the zone group; and returning the token for the zone group.

\* \* \* \* \*